US008982411B2

(12) United States Patent
Miyahara et al.

(10) Patent No.: US 8,982,411 B2
(45) Date of Patent: Mar. 17, 2015

(54) IMAGE PROCESSING APPARATUS AND METHOD

(75) Inventors: Seiji Miyahara, Chiba (JP); Yasunobu Shirata, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 999 days.

(21) Appl. No.: 12/923,128

(22) Filed: Sep. 3, 2010

(65) Prior Publication Data

US 2011/0058200 A1 Mar. 10, 2011

(30) Foreign Application Priority Data

Sep. 8, 2009 (JP) ................................ 2009-207327

(51) Int. Cl.
*H04N 1/60* (2006.01)
*G06K 15/00* (2006.01)
*H04N 1/40* (2006.01)
*G06K 9/00* (2006.01)
*G06K 9/36* (2006.01)
*H04N 7/167* (2011.01)
*H04K 1/00* (2006.01)
*G09C 3/00* (2006.01)
*H04L 9/32* (2006.01)
*G06F 17/30* (2006.01)

(52) U.S. Cl.
CPC ............ *H04N 1/603* (2013.01); *H04N 1/6075* (2013.01)
USPC .......... 358/1.9; 358/1.14; 358/3.28; 382/100; 382/232; 380/210; 380/287; 380/54; 713/176; 726/26; 726/31

(58) Field of Classification Search
CPC ................. H04N 1/56–1/628; G06K 15/1878; G06K 15/188; G06T 11/001
See application file for complete search history.

(56) References Cited

U.S. PATENT DOCUMENTS

| 2004/0179201 | A1* | 9/2004 | Schneider et al. ............. 356/445 |
| 2006/0176520 | A1* | 8/2006 | Motomura et al. ........... 358/451 |
| 2006/0188301 | A1* | 8/2006 | Ng et al. ....................... 399/341 |
| 2006/0192878 | A1 | 8/2006 | Miyahara et al. |
| 2007/0013927 | A1 | 1/2007 | Miyahara et al. |
| 2007/0211097 | A1* | 9/2007 | Yamazaki et al. .............. 347/14 |
| 2008/0007806 | A1* | 1/2008 | Shirasawa ..................... 358/520 |
| 2009/0122372 | A1 | 5/2009 | Miyahara et al. |

FOREIGN PATENT DOCUMENTS

| JP | 09-073223 A | 3/1997 |
| JP | 2001293926 A | 10/2001 |
| JP | 4200888 B2 | 10/2006 |
| JP | 2007271946 A | 10/2007 |
| JP | 2007-293832 A | 11/2007 |
| JP | 2008-077307 A | 4/2008 |

OTHER PUBLICATIONS

English language abstract of JP-2005167543 published Jun. 23, 2005 which corresponds to JP-4200888-B2.

* cited by examiner

*Primary Examiner* — Fred Guillermety
*Assistant Examiner* — Henok A Shiferaw
(74) *Attorney, Agent, or Firm* — Harness, Dickey & Pierce, P.L.C.

(57) ABSTRACT

An image processing apparatus includes: an extractor to extract colors used in input data; a converter to convert signals of the extracted colors into intermediate color signals each including three color signal components including brightness; an evaluator to evaluate recognizabilities of the colors based on the intermediate color signals; a generator to generate additional image data to be added to data for ordinary image formation based on a result of the evaluation and the input data; and a color convertor to convert the input data into the data for ordinary image formation.

8 Claims, 20 Drawing Sheets

FIG. 4

```
...
...
C100: Font{1}
C101: FontSize{10}
C102: FontColor{0,0,0}          <TEXT RENDERING COMMAND PORTION>
C103: Position{50,100}
C104: String{Sample Graph}
...
...
C301: FillColor{128,230,211}    <RECTANGLE RENDERING COMMAND PORTION>
C302: RectFill{50,100,20,20}
```

FIG. 5A

| No. | R | G | B | L* | a* | b* | Clear_flag | Corr. flag |
|---|---|---|---|---|---|---|---|---|
| 1 | 69 | 114 | 167 | 0.00 | 0.00 | 0.00 | 0 | 0 |
| 2 | 170 | 70 | 67 | 0.00 | 0.00 | 0.00 | 0 | 0 |
| 3 | 137 | 165 | 78 | 0.00 | 0.00 | 0.00 | 0 | 0 |
| 4 | 113 | 88 | 143 | 0.00 | 0.00 | 0.00 | 0 | 0 |
| 5 | 65 | 152 | 175 | 0.00 | 0.00 | 0.00 | 0 | 0 |
| 6 | 219 | 132 | 61 | 0.00 | 0.00 | 0.00 | 0 | 0 |

FIG. 5B

| No. | R | G | B | L* | a* | b* | Clear_flag | Corr. flag |
|---|---|---|---|---|---|---|---|---|
| 1 | 69 | 114 | 167 | 47.09 | 0.91 | -33.08 | 0 | 0 |
| 2 | 170 | 70 | 67 | 43.26 | 40.89 | 22.66 | 0 | 0 |
| 3 | 137 | 165 | 78 | 63.98 | -23.75 | 41.45 | 0 | 0 |
| 4 | 113 | 88 | 143 | 41.96 | 21.92 | -26.63 | 0 | 0 |
| 5 | 65 | 152 | 175 | 58.67 | -18.89 | -19.78 | 0 | 0 |
| 6 | 219 | 132 | 61 | 63.26 | 27.70 | 51.00 | 0 | 0 |

FIG. 7A

| No. | R | G | B | L* | a* | b* | Clear_flag | Corr. flag |
|---|---|---|---|---|---|---|---|---|
| 1 | 69 | 114 | 167 | 47.09 | 0.91 | -33.08 | 1 | 0 |
| 2 | 170 | 70 | 67 | 43.26 | 40.89 | 22.66 | 0 | 0 |
| 3 | 137 | 165 | 78 | 63.98 | -23.75 | 41.45 | 1 | 0 |
| 4 | 113 | 88 | 143 | 41.96 | 21.92 | -26.63 | 0 | 0 |
| 5 | 65 | 152 | 175 | 58.67 | -18.89 | -19.78 | 0 | 0 |
| 6 | 219 | 132 | 61 | 63.26 | 27.70 | 51.00 | 0 | 0 |

FIG. 7B

| No. | R | G | B | L* | a* | b* | Clear_flag | Corr. flag |
|---|---|---|---|---|---|---|---|---|
| 1 | 69 | 114 | 167 | 47.09 | 0.91 | -33.08 | 1 | 0 |
| 2 | 170 | 70 | 67 | 43.26 | 40.89 | 22.66 | 0 | 0 |
| 3 | 137 | 165 | 78 | 63.98 | -23.75 | 41.45 | 0 | 0 |
| 4 | 113 | 88 | 143 | 41.96 | 21.92 | -26.63 | 0 | 0 |
| 5 | 65 | 152 | 175 | 58.67 | -18.89 | -19.78 | 0 | 0 |
| 6 | 219 | 132 | 61 | 63.26 | 27.70 | 51.00 | 1 | 0 |

FIG. 10A

| No. | R | G | B | L* | a* | b* | Clear_flag | Corr. flag |
|---|---|---|---|---|---|---|---|---|
| 1 | 69 | 114 | 167 | 47.09 | 0.91 | −33.08 | 1 | 0 |
| 2 | 170 | 70 | 67 | 43.26 | 40.89 | 22.66 | 0 | 0 |
| 3 | 137 | 165 | 78 | 63.98 | −23.75 | 41.45 | 0 | 0 |
| 4 | 113 | 88 | 143 | 41.96 | 21.92 | −26.63 | 2 | 1 |
| 5 | 65 | 152 | 175 | 58.67 | −18.89 | −19.78 | 0 | 0 |
| 6 | 219 | 132 | 61 | 63.26 | 27.70 | 51.00 | 0 | 0 |

FIG. 10B

| R | G | B | R' | G' | B' |
|---|---|---|---|---|---|
| 113 | 88 | 143 | 62 | 37 | 83 |

FIG. 11

<INPUT DATA>

C100: Font{1}
C101: FontSize{15}
C102: FontColor{113,88,143}
C103: Position{50,100}
C104: String{Sample Graph}
...
...
C301: FillColor{69,114,167}
C302: RectFill{50,100,15,15}

<GENERATED DATA>

C100: FillColor{255}
C101: RectFill{50,100,15,15}

FIG. 12

$$R'_{sRGB} = R_{8bit} \div 255$$
$$G'_{sRGB} = G_{8bit} \div 255$$
$$B'_{sRGB} = B_{8bit} \div 255 \quad \cdots (1)$$

$$if \quad R'_{sRGB}, G'_{sRGB}, B'_{sRGB} \leq 0.04045$$
$$R_{sRGB} = R'_{sRGB} \div 12.92$$
$$G_{sRGB} = G'_{sRGB} \div 12.92$$
$$B_{sRGB} = B'_{sRGB} \div 12.92 \quad \cdots (2)$$

$$else \quad R'_{sRGB}, G'_{sRGB}, B'_{sRGB} > 0.04045$$
$$R_{sRGB} = [(R'_{sRGB} + 0.055)/1.055]^{2.4}$$
$$G_{sRGB} = [(G'_{sRGB} + 0.055)/1.055]^{2.4}$$
$$B_{sRGB} = [(B'_{sRGB} + 0.055)/1.055]^{2.4} \quad \cdots (3)$$

$$\begin{bmatrix} X \\ Y \\ Z \end{bmatrix} = \begin{bmatrix} 0.4124 & 0.3576 & 0.1805 \\ 0.2126 & 0.7152 & 0.0722 \\ 0.0193 & 0.1192 & 0.9505 \end{bmatrix} \begin{bmatrix} R_{sRGB} \\ G_{sRGB} \\ B_{sRGB} \end{bmatrix} \quad \cdots (4)$$

FIG. 13

$$h = \tan^{-1}\left(\frac{b*}{a*}\right) \quad \cdots (1)$$

(IF h < 0, h=h+360)

$$C = \sqrt{a*^2 + b*^2} \quad \cdots (2)$$

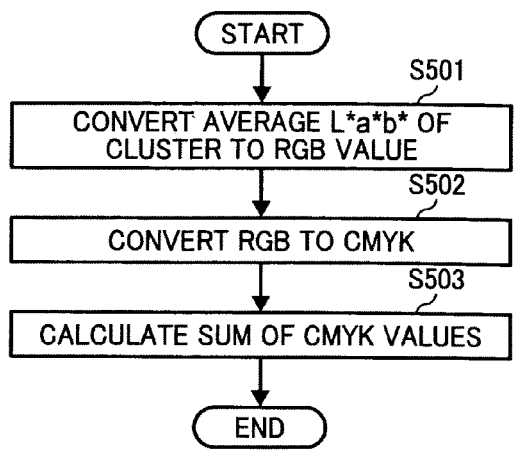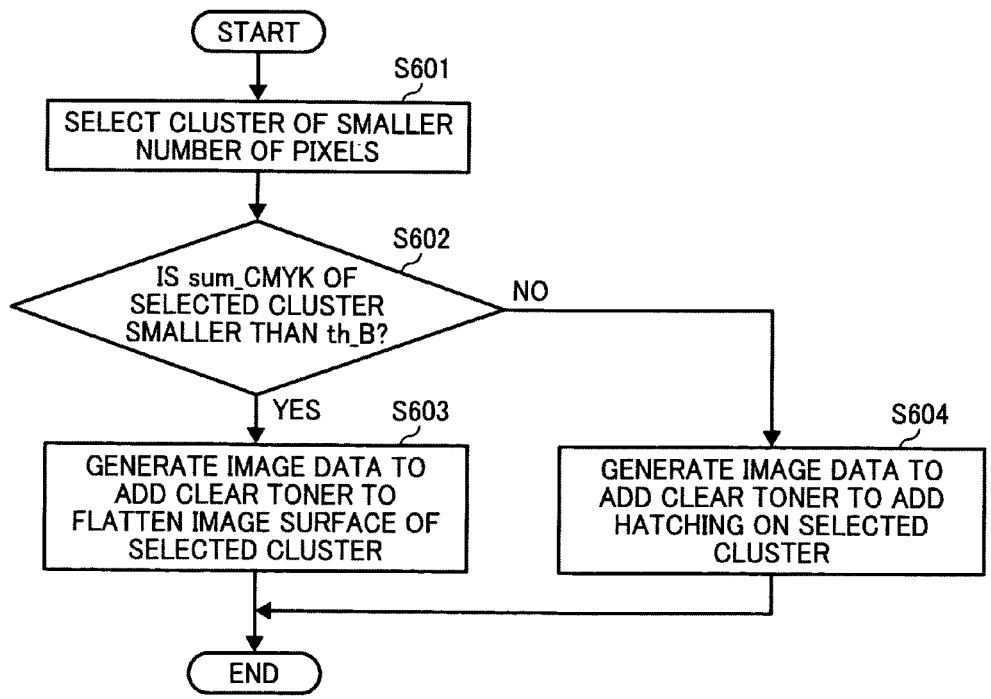

PREVIOUSLY
PREPARED
HATCHING IMAGE

PIXEL AREA
BELONGING TO
SELECTED CLUSTER
NUMBER =
MASK AREA

GENERATED
ADDITIONAL
IMAGE DATA

IMAGE PROCESSING APPARATUS AND METHOD

CROSS-REFERENCE TO RELATED APPLICATIONS

The present application claims priority to and incorporates by reference the entire contents of Japanese Patent Application No. 2009-207327 filed in Japan on Sep. 8, 2009.

BACKGROUND OF THE INVENTION

1. Field of the Invention

The present invention relates to a method, an apparatus, a program, and a recording medium for image processing of converting colors to allow a color-weak person to distinguish colors more easily without making a document creator or a person with common color vision feel a sense of incongruity.

2. Description of the Related Art

In recent years, advancement of color image output technology for displaying and printing out color images has allowed individuals and companies to use various colored characters and color images to create documents and web pages. In such documents, the colors themselves are often made to carry important information by using colored characters and the like for notations to draw attention and for grouping graphs. To understand the contents of such documents correctly, the characters and images need to be recognized and further, the differences between the colors used in the documents need to be distinguished.

Even for such documents using various colors, color information is difficult to be distinguished for people with color vision impairment. For example, for a color vision with difficulty in distinguishing between red and green, of a graph using red, green, and blue, the red and the green are difficult to be identified or are completely impossible to be identified, and thus the graph may be just recognized as a graph consisting of two elements, "blue" and "other than blue". Furthermore, because color image output apparatuses are able to express multiple colors, coloring that is difficult to recognize even for people with common color vision may sometimes obtained.

FIG. 1 is an example of a document including colored characters, a pie chart, and a photograph. In the coloring of the pie chart illustrated in FIG. 1, differences between colors are relatively recognizable because the pie chart has a comparatively large area and the colors are adjacent to each other. To read the pie chart, the pie chart needs to be related to a legend, but the legend portion has a small area and thus the difference between their colors are difficult to be recognized and the association between the pie chart and the legend is difficult. Similarly, as to colored characters, if the font of the characters is fine like the Mincho type and the size of the characters is small, the colored characters used are hard to be recognized. As to images of natural objects such as photographs, the objects are often empirically relatable to color names (e.g. leaves are green and human faces are in skin colors), and the coloring itself often has no meaning.

According to physiological and medical studies on human color visions, certain types of color vision impairment are known, like red-green color blindness with difficulty in distinguishing red and green as exemplified above, yellow-blue color blindness, and total color blindness. Recently, Color Universal Design Organization (CUDO, a non-profit organization) suggests calling various color visions, not by grouping color visions based on whether each color vision is normal or abnormal, but by their type names such as common (C) type, protanope (P) type (severe or mild) corresponding to red-green color blindness or color weakness, deuteranope (D) type (severe or mild) corresponding to red-green color blindness or color weakness, tritanope (T) type corresponding to yellow-blue color blindness, and achromatic (A) type corresponding to total color blindness. Further, CUDO suggests calling people having the C type color vision "people with common color vision" and the others having a weakness in recognizing colors as "color-weak people".

To make colors easily recognizable in consideration of such color vision impairment, techniques have been proposed in which the colors used in a document are extracted and, if the extracted colors includes a combination of colors that is hard to distinguish from each other, (1) the colors are adjusted (for example, see Japanese Patent Application Laid-open No. 2007-293832), (2) the filled areas in graphs and the like are hatched (for example, see Japanese Patent Application Laid-open No. 2008-77307), and (3) the filled areas are fringed (for example, see Japanese Patent Application Laid-open No. 2001-293926).

Furthermore, as a display that is easily recognized both by people with color vision impairment and by people with common color vision, a display object that is seen in red and green when viewed from the front but seen in green and blue respectively when viewed obliquely is also available (see Japanese Patent Application Laid-open No. 2007-271946).

However, in the above method (1), because the area of the legend in the graph is small, the difference between the colors is difficult to be recognized, and thus the colors need to be changed largely (for example, when there is little difference between their lightnesses, even changing the b* component in CIELAB color space by $\Delta b^* = 45$ may not make the colors distinguishable), and a person who knows the original coloring such as the creator of that document may feel a sense of incongruity.

In the method (2), because cyclically inserting diagonal lines in the filled areas of the graph changes the form of the image, similarly to the method (1), the creator of the original image may feel a sense of incongruity, and color-weak people may need to recognize the form of the hatching and then identify the association between the graph and the legend, and thus the graph is less intuitively readable than the color differences. Furthermore, when the area of the legend is too small and the hatching pattern is coarse, a cycle of that pattern may not fit into the legend and thus the hatching is not sufficiently effective.

In the method (3), although isolation of areas is recognizable by the fringes around the filled areas, unless the difference between the colors is not recognizable, the association between the graph and the legend is not possible, and thus this method is not a fundamental solution.

In Japanese Patent Application Laid-open No. 2007-271946, the state of the surface of each area of the display object is made different by the difference between hues of the areas. However, because the colors are changed, people with common color vision feel a sense of incongruity and because of the structure of the display object, application to printouts output from an image forming apparatus is difficult.

SUMMARY OF THE INVENTION

It is an object of the present invention to at least partially solve the problems in the conventional technology.

According to an aspect of the present invention, an image processing apparatus is configured to convert input image data into image data for forming an image and includes: a color extracting unit configured to extract colors used in the input image data; a color signal converting unit configured to convert signals of the extracted colors into intermediate color signals each including three color signal components including brightness; a recognizability evaluating unit configured to evaluate recognizabilities of the colors based on the intermediate color signals converted; an additional image generating unit configured to generate additional image data to be added to data for ordinary image formation based on a result of the evaluation by the recognizability evaluating unit and the input image data; and a color converting unit configured to convert the input image data into the data for ordinary image formation.

According to another aspect of the present invention, an image processing method, of converting input image data into image data for forming an image, includes: extracting colors used in the input image data; converting signals of the extracted colors into intermediate color signals each including three color signal components including brightness; evaluating recognizabilities of the colors based on the intermediate color signals converted; generating additional image data to be added to data for ordinary image formation based on a result of the evaluation and the input image data; and converting the input image data to the data for ordinary image formation.

According to still another aspect of the present invention, an image processing apparatus includes: a clustering unit configured to classify pixels of input image data into a plurality of clusters pixel by pixel based on color differences; a recognizability judging unit configured to judge, of the plurality of clusters, a combination of clusters that is hard to recognize for a color-weak person; an information obtaining unit configured to obtain information of target clusters that are the combination of clusters judged to be hard to recognize by the recognizability judging unit; an additional image data generating unit configured to generate additional image data to be added to the target clusters based on the information of the target clusters obtained; a color converting unit configured to convert the input image data into data for ordinary image formation; and an image forming unit configured to form an output image on a recording medium based on the data for ordinary image formation and the additional image data.

According to yet another aspect of the present invention, an image processing method includes: classifying pixels of input image data into a plurality of clusters pixel by pixel based on color differences; judging, of the plurality of clusters, a combination of clusters that is hard to recognize for a color-weak person; obtaining information of target clusters that are the combination of clusters judged to be hard to recognize; generating additional image data to be added to the target clusters based on the information of the target clusters obtained; converting the input image data into data for ordinary image formation; and forming an output image on a recording medium based on the data for ordinary image formation and the additional image data.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 4 depicts an example of input image data described in PDL;

FIG. 5A is a chart depicting an example of extracted colors used, and FIG. 5B is a chart depicting an example of Lab values of the colors used;

FIGS. 7A and 7B are charts depicting examples of colors judged to be overlaid with a clear toner;

FIG. 10A depicts a result of evaluation performed according to the flowchart of the process illustrated in FIG. 9;

FIG. 10B depicts an example of a color correction table;

FIG. 11 depicts an example of additional image data;

FIG. 12 depicts equations for conversion of sRGB values to XYZ tristimulus values;

FIG. 13 depicts equations for calculation of hue angle and chroma;

FIG. 20 is a flowchart illustrating a process to calculate the amount of color materials for a cluster according to a fourth embodiment of the present invention;

FIG. 21 is a flowchart illustrating a process performed in an additional image generating unit according to the fourth embodiment;

DETAILED DESCRIPTION OF THE PREFERRED EMBODIMENTS

Exemplary embodiments of the present invention will be explained in greater detail below with reference to accompanying drawings.

First Embodiment

According to the present invention, when performing color conversion of converting input color image data to image data for forming an image, colors used in the input image data are extracted, the extracted colors are evaluated for any combination of colors that are hard to be distinguished by color-weak people, and when a combination of colors that are hard to be distinguished is present, image data for forming a clear toner image corresponding to an area of one of the colors of that combination is generated to form an image.

Figure 1:
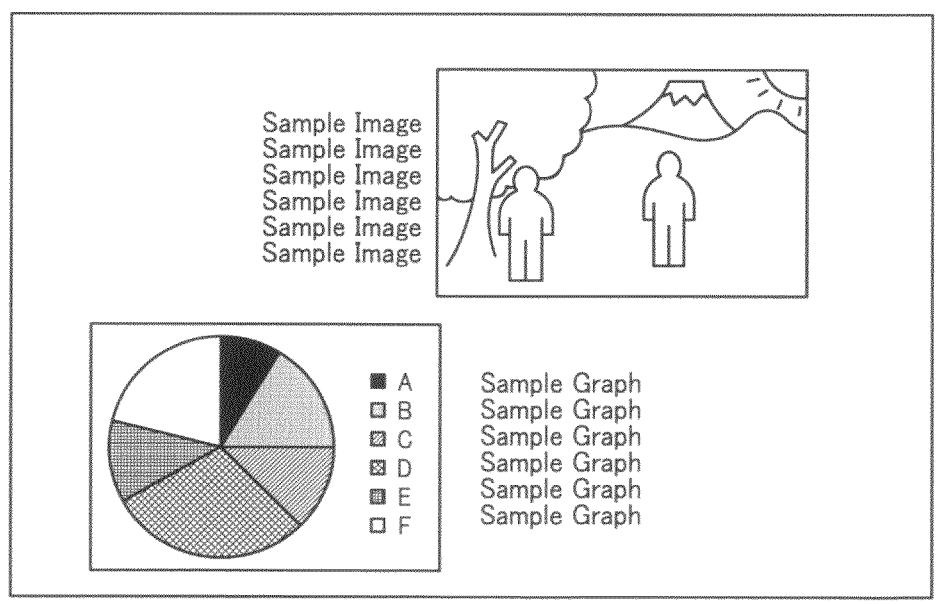
FIG. 1 depicts an example of a document including a graph and colored characters.
Figure 2:
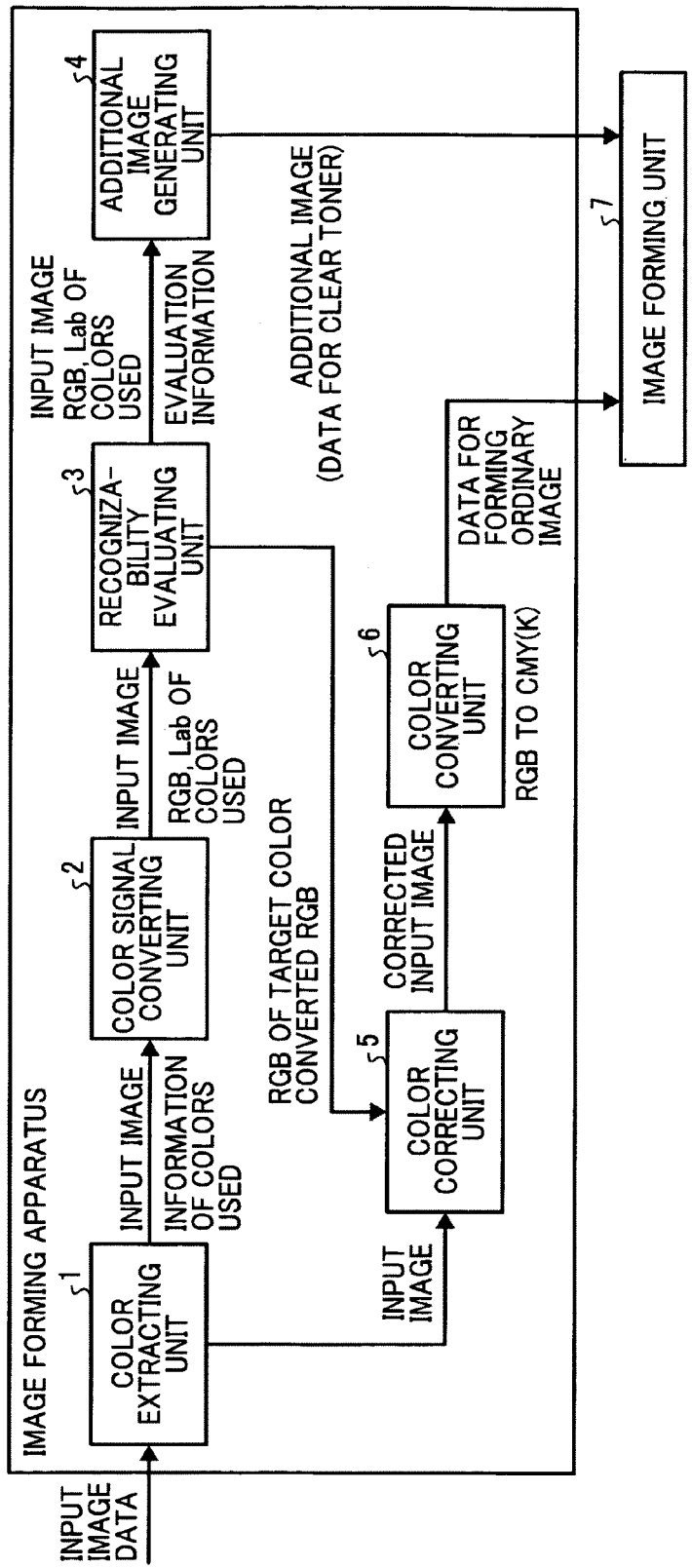
FIG. 2 is a block diagram illustrating a configuration of an image processing apparatus according to a first embodiment of the present invention.

FIG. 2 illustrates an overall configuration of an image processing apparatus according to a first embodiment of the present invention. The image processing apparatus according to the first embodiment includes a color extracting unit 1, a color signal converting unit 2, a recognizability evaluating unit 3, an additional image generating unit 4, a color correcting unit 5, and a color converting unit 6.

The color extracting unit 1, upon receiving input image data (written in page description language (PDL) for printers), extracts color information (RGB values) on color filled areas such as a rectangle and a circular arc. The color signal converting unit 2 converts the RGB values of the colors used in the image data extracted by the color extracting unit 1 into perception values such as CIELAB L*a*b* values.

The recognizability evaluating unit 3, based on the L*a*b* values of the colors used, evaluates recognizabilities of all combinations of the colors, extracts any combination that has a problem in its recognizability, and determines on which color an image of a clear toner is to be added, which colors are to be corrected, and how much to correct if the color correction is to be performed. To determine target areas, the information concerning lightness and chroma of the input colors is used.

Equation 1 is an equation for the recognizability evaluation.

$$(\text{Recognizability}) = \alpha |\Delta L^*| + \beta |\Delta b^*| \quad (1)$$

The additional image generating unit 4, based on a result of the recognizability evaluation, generates image data for forming a clear toner image. For coordinates and sizes, a page description of the input image is referred to. The color correcting unit 5, based on the evaluation result made by the recognizability evaluating unit 3, corrects lightness and hue of the target color to be color-corrected in the input image data. The color converting unit 6 carries out color conversion by an ordinary 3D-LUT with respect to the input image data that has been subjected to the color correction. An image forming unit 7, based on the data for forming an image received from the color converting unit 6 and the additional image generating unit 4, forms the image on an output medium (paper medium).

Figure 3:
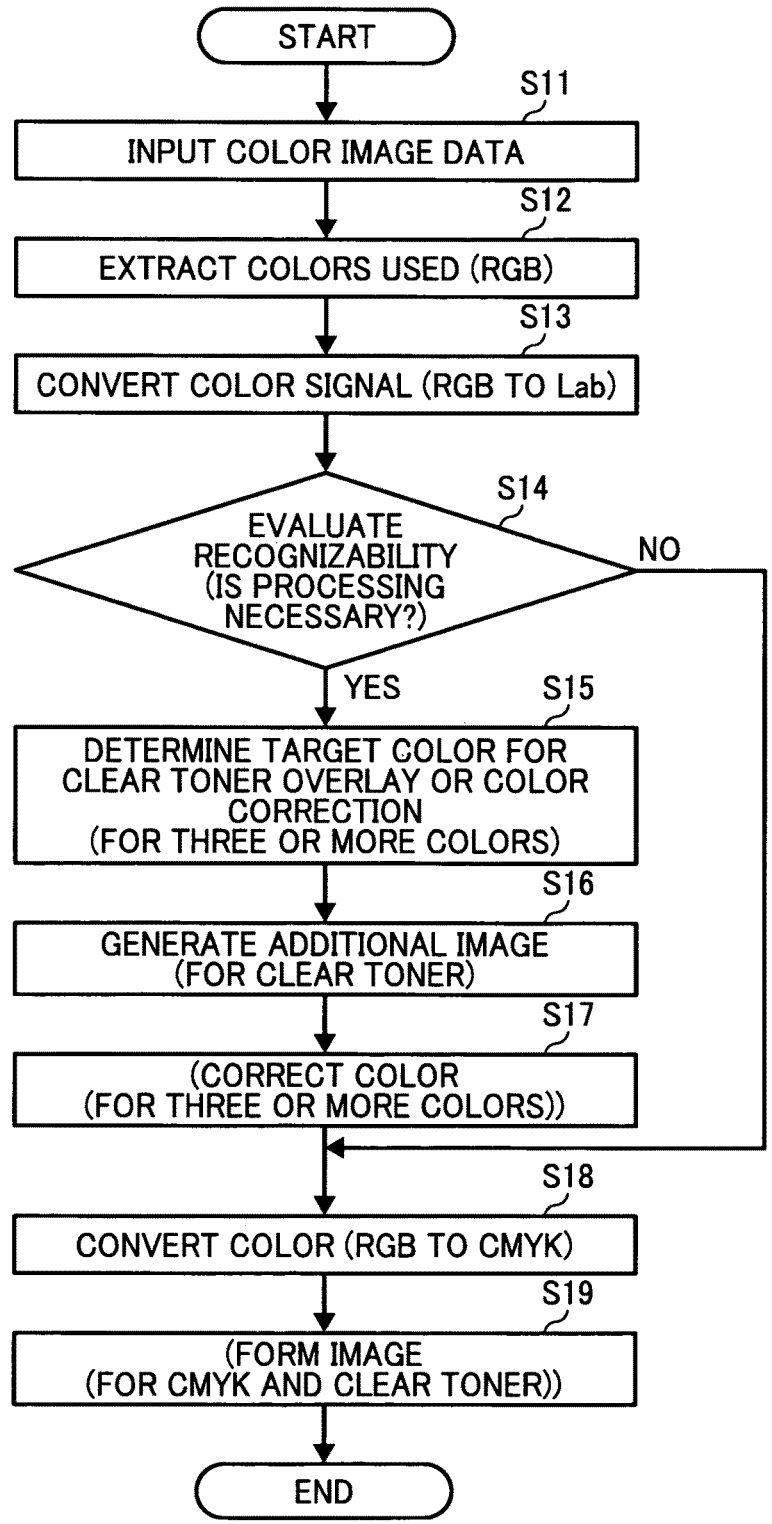
FIG. 3 is a flowchart illustrating a process performed according to the first embodiment.

FIG. 3 is a flowchart illustrating a process performed according to the first embodiment. The image data (document data) written in PDL containing graphs and text is received (S11). The color extracting unit 1 extracts RGB values of the colors used for the image from the input image data (S12). The color signal converting unit 2 converts the RGB values of extracted colors used (ordinary office documents are created mostly in sRGB values and hereinafter, the input image is described as being input via sRGB values, but it is not limited thereto, and an extended RGB space such as Adobe RGB (1998) (registered trademark) or scRGB may be used, or a color space of brightness-color difference system such as sYCC may be used) into CIELAB values or the like (S13).

The recognizability evaluating unit 3 then evaluates whether there is any combination of colors that are hard for color-weak people to distinguish in the used colors converted at Step S13 by using Equation 1 for recognizability evaluation and judges whether a process to overlay a clear toner image or to correct the color is necessary (S14). When the overlay of a clear toner image or the color correction is necessary, the recognizability evaluating unit 3 determines on which color the clear toner image is to be overlaid or on which color the color correction is to be performed (S15). Thereafter, the additional image generating unit 4 generates an additional image for a clear toner with respect to the target color determined at Step S15 to be overlaid with the clear toner image (S16), and the color correcting unit 5 performs the color correction for the color determined necessary to be color-corrected at Step S15 (S17).

The color converting unit 6 performs, if only the overlay of the clear toner image is performed, with respect to the original input image, conversion from the RGB values to CMYK values using an ordinary 3D-LUT or the like, and performs, if the color correction is performed at Step S17, with respect to the input image that has been corrected, conversion using the ordinary 3D-LUT or the like (S18). Finally, the image forming unit 7 of the image processing apparatus forms an image formed of ordinary CMYK toners overlaid with the image of the clear toner (S19).

FIG. 4 depicts an example of the input image data described in page description language. In FIG. 4, lines C100 to C104 illustrate an example of a command for rendering text, and specification of font, specification of font size, specification of font color, specification of rendering position, and contents of rendering are described in this order. Lines C301 and C302 illustrate an example of a command for rendering a graphic, more specifically for rendering a rectangle, and rendering of filling a rectangle area having two diagonal coordinates of [50, 100] and [20, 20] with a color having RGB values of [R, G, B]=[128, 230, 211] is performed.

The color extracting unit 1 searches for an xxxFill command for filling the above graphic and a FillColor command and a SetRgbColor command that specify a color, and extracts the RGB values of a color singularly used to fill an area. FIG. 5A illustrates an example in which six used colors have been extracted by the color extracting unit 1. In the table, "No." indicates the sequential order of the extraction, and "R", "G", and "B" represent the RGB values of the color used. Other values are used by the color signal converting unit or the like and are all initialized to zero at this point in time. The information on the used colors thus extracted is sent to the color signal converting unit 2 together with the input image data.

Equations 2 in FIG. 12 are equations to convert sRGB values into XYZ tristimulus values. The color signal converting unit 2 receives the RGB values of the colors used and then converts the values into L*a*b* values (hereinafter, "*" is omitted) in the CIELAB space.

In the conversion of sRGB values into Lab values, the sRGB values are converted into XYZ tristimulus values (equations marked with bracketed numbers 1 to 4 in Equation 2) based on the specification of sRGB (IEC/4WD 61966-2-1: Colour Measurement and Management in Multimedia Systems and Equipment-Part 2-1: Default RGB Colour Space-sRGB). The Lab values are then calculated according to the definitions of the CIELAB color coordinate system.

FIG. 5B illustrates an example in which information on used colors including Lab values has been calculated by the color signal converting unit for the six extracted used colors. Here, the sRGB values that are common in office documents are the input RGB values, and the values obtained after the conversion are the Lab values, but if the color information of the input image data is described in an extended color space other than the sRGB, conversion into the Lab values via XYZ tristimulus values may be performed according to those definitions. CMYK values may be used instead of the RGB values. However, the values need to be uniquely convertible to color specification values of a color perception space such as Lab with defining equations, converting tables, or prediction models. Furthermore, it is not necessarily limited to Lab and, for example, JCaCb values in CIECAM02 color appearance model defined by CIE may be used.

The recognizability evaluating unit 3 then evaluates the recognizability of the colors used using the Lab values of the used colors as in FIG. 5B. There are six colors in this example. Therefore, the recognizability is evaluated in sequence for a total of 15 combinations of two of the six colors, i.e., for $_6C_2=6\times5/2=15$ combinations. The recognizability is evaluated by the sum of the difference in lightness ($\Delta L$) and the difference in b-component ($\Delta b$) between the colors used each multiplied by a given coefficient as in Equation 1. In Equation 1, the coefficients $\alpha$ and $\beta$ are constants satisfying $\alpha>\beta$ and are values obtained in advance through subjective evaluation by color-weak people. For example, when the coefficients are defined as $\alpha=0.17$ and $\beta=0.13$, the recognizability of the colors between No. 1 and No. 2 indicated in FIG. 5B is calculated as:

(Recognizability)=0.17×|47.09−43.26|+0.13×|−33.08−22.66|=7.90

Similarly, the recognizability of the colors between No. 1 and No. 4 is obtained as:

(Recognizability)=0.17×|47.09−41.96|+0.13×|−33.08−(−26.63)|=1.71

The recognizability evaluating unit 3 judges that the recognizability by color-weak people is low when the evaluation value of the recognizability obtained by Equation 1 is equal to or less than a predetermined value (here, equal to or less than 3.0).

When the recognizability for all six colors indicated in FIG. 5B is evaluated in the order of (1-2), (1-3), (1-4), and so on, the evaluation value between No. 1 and No. 4 becomes 1.7 and that between No. 3 and No. 6 becomes 1.4, both being less than the predetermined value (falls below 3.0). In these cases, which color to overlay with a clear toner is judged to improve the recognizability. The method of such judgment will be explained later.

In the present embodiment, a clear toner that increases glossiness as the amount of overlay is increased is used (in reality, there are some clear toners that do not increase glossiness even if the amount of overlay is increased, but it is still possible to make a difference in glossiness even with such clear toners).

Figure 6:
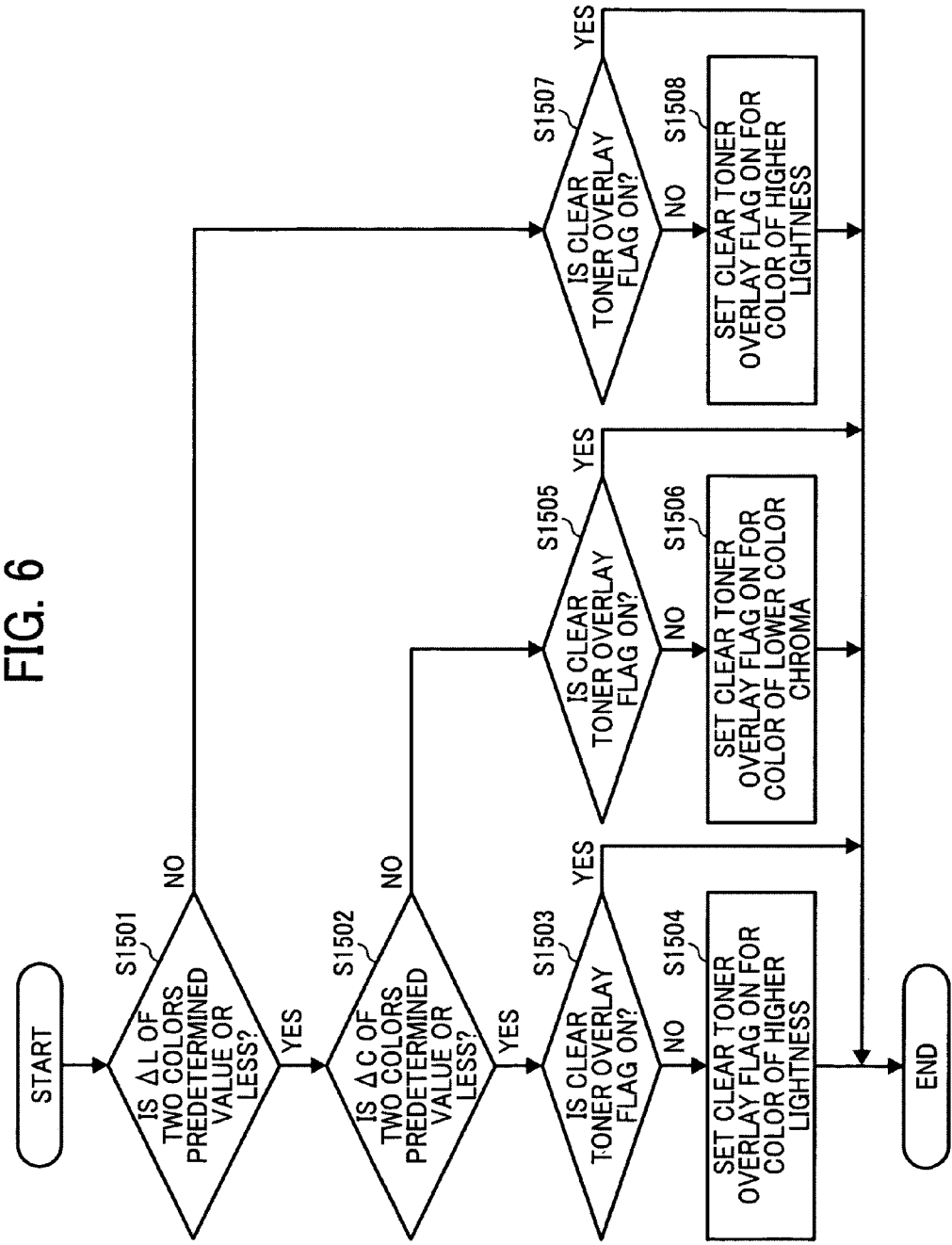
FIG. 6 is a flowchart illustrating a process performed in a recognizability evaluating unit (determination of color over which a clear toner is to be overlaid based on lightness and chroma)

FIG. 6 is a flowchart illustrating the process of determining the color to be overlaid with a clear toner based on lightness and chroma in the recognizability evaluating unit.
(For Combinations Each of Up to Two Colors of Low Recognizability)

When the recognizability is determined to be low upon the recognizability evaluation, whether the difference in lightness $\Delta L$ between the two target colors is equal to or less than a predetermined value (for example, 5) is judged (S1501). When it is equal to or less than the predetermined value, by calculating the chroma C of the two colors by the equation with a bracketed number 2 in Equations 3 indicated in FIG. 13 and then calculating the difference in chroma $\Delta C$ between the two colors, whether the difference in chroma $\Delta C$ is equal to or less than a predetermined value (for example, 10) is judged (S1502). When it is equal to or less than the predetermined value, in other words, when there is not much difference in both lightness and chroma and image formation is expected to be performed with about the same amounts of toners in an ordinary color conversion, whether a clear toner overlay flag is already on for one of the colors is checked (S1503). When neither is on, of the two colors, with respect to the color having a higher lightness, with which an image is considered to be formed with a less amount of toner, the flag indicating that a clear toner is to be overlaid is flagged (S1504). On the contrary, at Step S1503, if one of the colors already has the clear toner overlay flag on, the process to improve the recognizability with the clear toner is performed, and thus the present process ends.

At Step S1502, if the difference in chroma exceeds the predetermined value, whether one of the colors is already flagged with the clear toner overlay flag is checked, so as to overlay the color having a lower chroma, with which an image is considered to be formed with a less amount of toner, with a clear toner (S1505). If neither is flagged, with respect to the color having the lower chroma, the clear toner overlay flag is flagged (S1506). At Step S1501, if the difference in lightness between the two colors is judged to be large, to overlay with a clear toner the color having a higher lightness, with which an image is considered to be formed with a less amount of toner, whether a flag is already on is checked (S1507) and the clear toner overlay flag is flagged for the color having the higher lightness (S1508).

FIG. 7A illustrates an example of a result of the determination made by the recognizability evaluating unit 3 based on lightness and chroma for colors to be overlaid with a clear toner. The flags are on for No. 1 and No. 3.

Generally, in image forming apparatuses using color materials, such as printers, the use of too much color materials causes degradation in image quality due to dusting off and bleeding of the color materials. The clear toner is overlaid on the color deemed to consume less toner as described above to prevent this problem.

Figure 8:
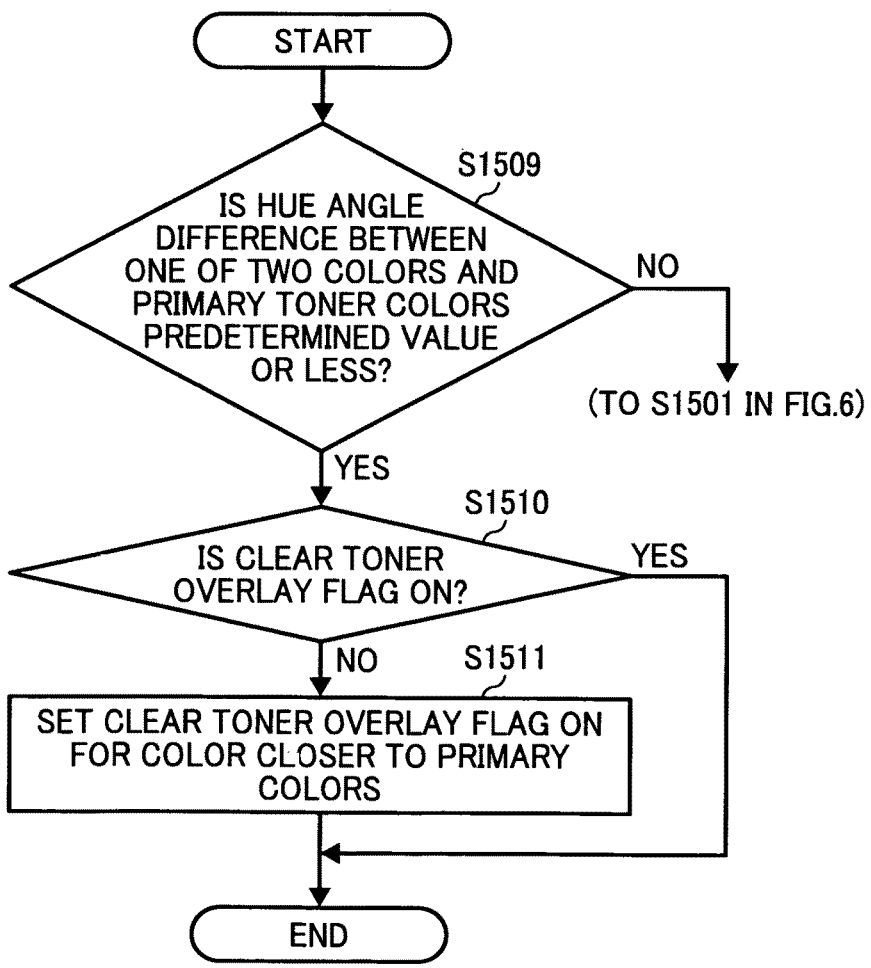
FIG. 8 is a flowchart illustrating a process performed in the recognizability evaluating unit (determination of a color over which the clear toner is to be overlaid based on a hue angle)

FIG. 8 is a flowchart illustrating a process of determining the color to be overlaid with a clear toner based on hue angles in the recognizability evaluating unit.
(For Combinations Each of Up to Two Colors of Low Recognizability)

If the recognizability is judged to be low after the recognizability evaluation, hue angles of the two colors of that combination are calculated by the equation with a bracketed number 1 in Equations 3 in FIG. 13. The difference values $\Delta h$ between these hue angles and hue angles of chromatic color toners used in image formation (generally, cyan C, magenta M, and yellow Y) are then calculated, and whether there is a combination for which the difference values of each of the two target colors with respect to C, M, and Y colors are equal to or less than a predetermined value (for example, $\Delta h=5$) is present is evaluated (S1509).

The hue angles of C, M, and Y colors vary depending on the recording density on an image recording medium such as paper. Accordingly, color measurement or the like is performed beforehand and recorded to be used in the evaluation for a case in which, for example, the optical density of each color is 1.2 on a predetermined recording medium. The hue angles of C, M, and Y colors used here are, for example, C: 180 degrees, M: 300 degrees, and Y: 60 degrees, respectively.

The hue angle judgment on the colors No. 3 and No. 6 in FIG. 5B will be explained. The hue angle of the color No. 3 is 119.8 degrees according to the equation with the bracketed number 1 in Equations 3, and similarly, that of the color No. 6 is 61.5 degrees. Consequently, the differences $\Delta h$ of the color No. 3 from all of C, M, and Y colors are over 5, while the difference of the color No. 6 from Y color is $\Delta h=1.5$. In this case, the difference of the hue angle of one of the colors from the primary colors of toners (C, M, and Y) is less than the predetermined value and thus to overlay the color closer to the primary colors with a clear toner, the clear toner overlay flag is checked (S1510) and, for the color closer to the primary colors, the clear toner overlay flag is flagged (S1511).

At Step S1509, if the differences in hue angle of neither of the two target colors from the primary colors of toners are equal to or less than the predetermined value, the judgment based on the lightness and chroma illustrated in FIG. 6 is performed. FIG. 7B illustrates an example of results of the judgments made in FIGS. 8 and 6. That is, FIG. 7B illustrates an example in which determination of a color to be overlaid with a clear toner based on lightness and chroma has been performed after determination of color to be overlaid with a clear toner based on hue angles in the recognizability evaluating unit. As a result of the process illustrated in FIG. 8, unlike in FIG. 7A, because the judgment based on hue angles is performed on the colors No. 3 and No. 6, the flag for overlay of a clear toner is on for the color No. 6 here.

Figure 9:
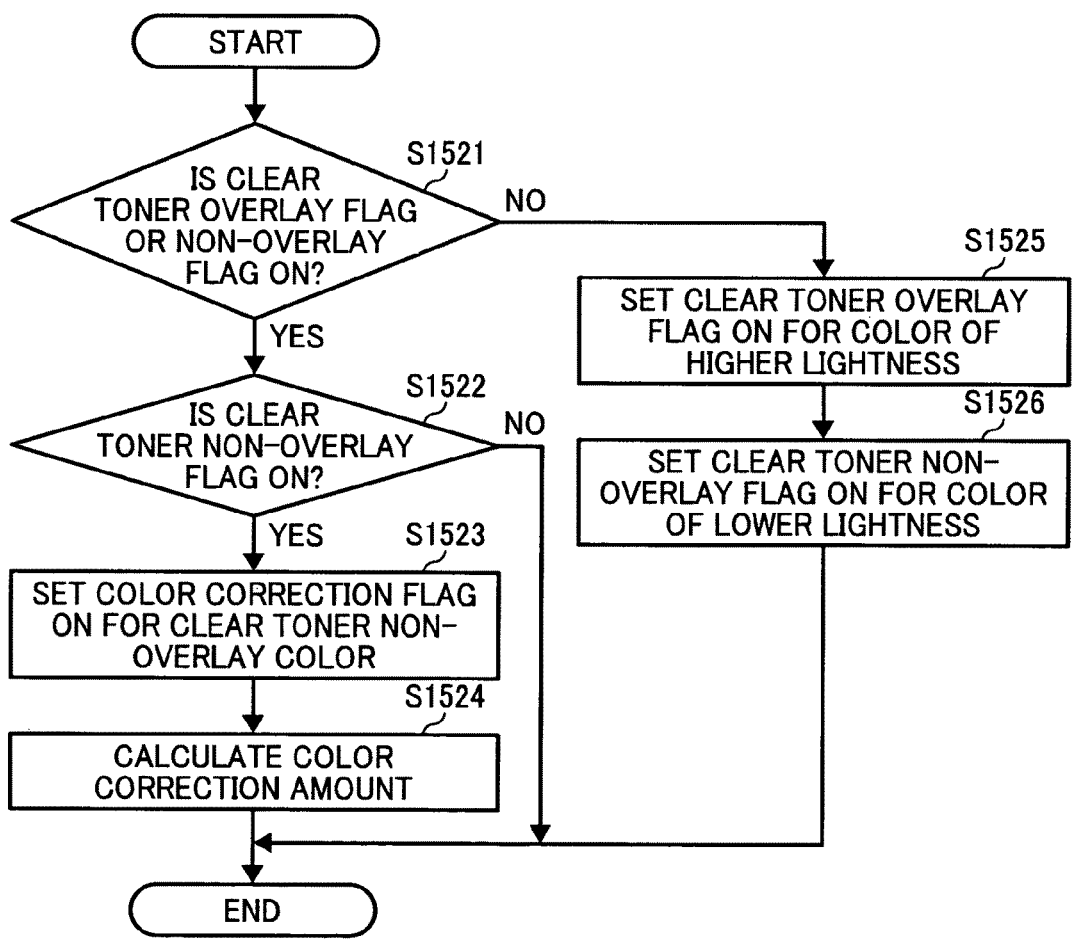
FIG. 9 is a flowchart illustrating a process performed in the recognizability evaluation unit (with three colors of low recognizability)

FIG. 9 is a flowchart illustrating the process performed in the recognizability evaluating unit to determine target colors to be overlaid with a clear toner and target colors to be subjected to color correction in a case in which three colors have been found to be low in recognizability.

(For Combinations Each of Three Colors of Low Recognizability)

In the following explanation, it is assumed that, as a result of the recognizability evaluation performed similarly to that described already, as an example, the recognizabilities of colors No. 1, No. 4, and No. 5 of the six colors used in FIG. 7B have been determined to be low (as described already, the recognizability between the colors No. 1 and No. 4 is low, but the recognizabilities between No. 1 and No. 5 and between No. 4 and No. 5 are actually not low).

In the judgment of on which one of the combination of colors that is low in recognizability a clear toner is to be overlaid, with respect to the colors No. 1 and No. 4, whether the clear toner overlay flag or a non-overlay flag explicitly indicating not to overlay the clear toner is already not on is checked (S1521). If a flag is not on, the clear toner overlay flag is flagged for the color having a higher lightness (S1525). That is, in this example, because the color No. 1 has a higher lightness, the clear toner is to be overlaid on the color No. 1. In addition, for the color No. 4 that is the other of the two colors having a lower lightness, the clear toner non-overlay flag ("2" to distinguish it from the overlay flag "1") is flagged.

Next, the colors No. 1 and No. 5 are compared. Because the clear toner overlay flag is already on for the color No. 1, subsequently, whether the clear toner non-overlay flag is on is checked (S1522). If the clear toner non-overlay flag is not on, because the clear toner overlay flag is on for the other color in this case, the recognizability of these two colors are ensured by the presence and non-presence of the clear toner, and thus the present process ends before moving on to the processing of the next color combination. In this example, because the clear toner non-overlay flag is not on for the color No. 5, no processing is performed. Finally, the colors No. 4 and No. 5 are compared. In this example, because the non-overlay flag is on for the color No. 4, whether the non-overlay flag is on is checked at Step S1522, and a color correction flag (Corr. flag) is flagged for the color No. 4 (S1523). FIG. 10A illustrates an example of the result of the judgment according to the flowchart of the process illustrated in FIG. 9. That is, FIG. 10A illustrates an example in which the target colors to be overlaid with the clear toner and the target colors to be subjected to the color correction have been determined by the recognizability evaluating unit 3.

The calculation of color correction parameters (S1524) for the color No. 4 flagged with the color correction flag (Corr. flag) will be explained. To calculate the amount of color correction, L-component and b-component of the color No. 4 are assigned with chromaticness in the range of, for example, ±10 in steps of 2 (a wider range in finer steps is more desirable) and the recognizabilities with the other colors used (here, the five colors except No. 4) are evaluated by Equation 1. However, if the lightness becomes a negative value, the evaluation is not performed.

(Color Assignment of No. 4 Color)

$(L,a,b)=(41.96,21.92,-26.63),(41.96+2,21.92,-26.63),$
$(41.96+4,21.92,-26.63),\ldots,(41.96+10,21.92,-26.63),(41.96,21.92,-26.63+2),\ldots,$
$(41.96,21.92,-26.63+10),(41.96-2,21.92,-26.63),\ldots.$ If the minimum value (worst value) of the result of the recognizability evaluation with respect to the other colors used is the largest, that is, the Lab values having the best recognizability with the other colors used within the range in which the chromaticness have been assigned are used as the color specification values that have been subjected to the color correction. To perform this correction in the color correcting unit 5 of FIG. 2, the Lab values used are converted to the sRGB values by a conversion inverse to the conversion of RGB to Lab by the color signal converting unit 2, and a correction table (FIG. 10B) associating the RGB values of the input data with the corrected RGB values is generated and sent to the color correcting unit 5.

The color correcting unit 5, similarly to the extraction of colors performed by the color extracting unit 1, searches for an xxxFill command for filling in the graphic in the input image data and commands that specify a color such as a FillColor command and a SetRgbColor command. When the RGB values of the color used in the filling match the RGB values in FIG. 10B, the RGB values are replaced with the corrected R'G'B' values and the replaced input image data are sent to the color converting unit 6. The color converting unit 6, using ordinary color conversion parameters (e.g., 3D-LUT), converts the input image data or the color corrected input image data to image data for forming an image and sends them to the image forming unit 7.

FIG. 11 depicts an example of additional image data generated by the additional image generating unit. The additional image generating unit 4 receives information on the colors used and the clear toner overlay flags as illustrated in FIG. 10A and the input image data. The additional image generating unit 4 then searches for a portion where the RGB values of the color with the clear toner overlay flag set to 1 (in FIG. 10A, (R, G, B)=(69, 114, 167)) match the RGB values of the color specifying command used by the command to fill a graphic (C301 line indicated in FIG. 11) in the input image data. If a match is found, the additional image generating unit 4 generates the data for forming a clear toner image (C100 of generated data) in the same area (C302 line of input data corresponds to C101 of generated data) and sends the generated data for forming an image to the image forming unit 7. The image forming unit 7 forms the ordinary image overlaid with the clear toner image on a recording medium such as paper.

The following exemplary embodiments are modification examples of overlaying a clear toner.

Second Embodiment

A second embodiment of the present invention is an exemplary embodiment of detecting from an input image clusters having a combination of colors hard for color-weak people to recognize, and performing image formation using a clear toner for the clusters detected, to control the glossiness of the colors, thereby improving the recognizability by the color-weak people and reducing the amount of clear toner consumption, without making people with common color vision feel a sense of incongruity.

Figure 14:
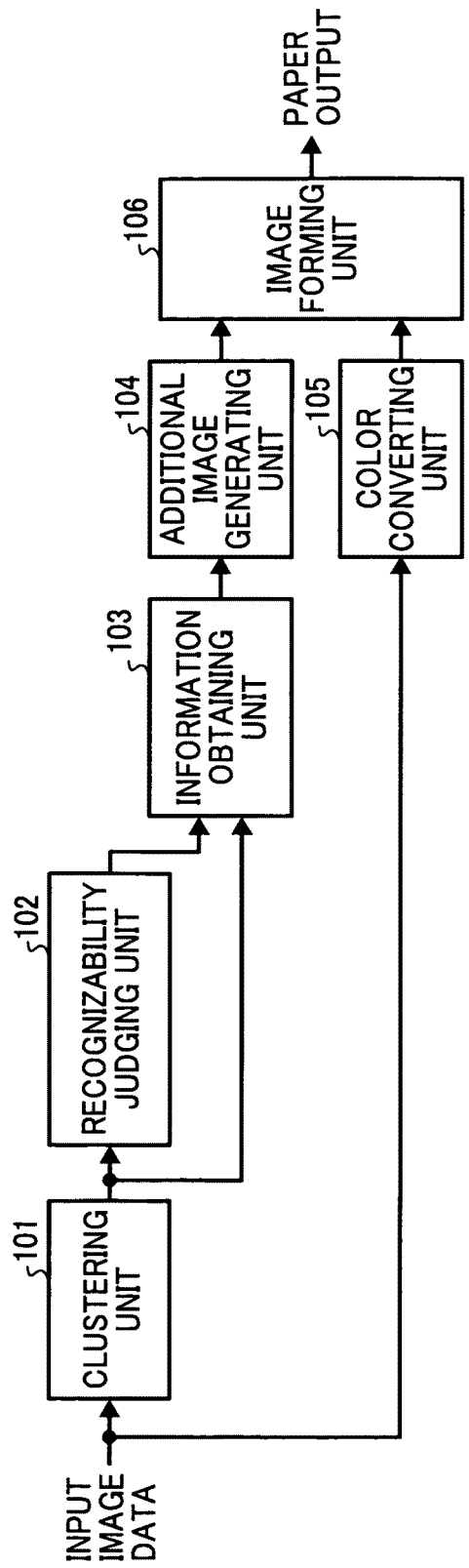
FIG. 14 is a block diagram illustrating a configuration of an image processing apparatus according to a second embodiment of the present invention.

FIG. 14 is a block diagram illustrating a configuration of an image processing apparatus according to the second embodiment. The image processing apparatus according to the second embodiment includes a clustering unit 101, a recognizability judging unit 102, an information obtaining unit 103, an additional image generating unit 104, a color converting unit 105, and an image forming unit 106.

In the following explanation, the color information of input image data is basically formed of RGB data and, in each processing unit, the RGB values are converted as necessary and as appropriate to CIE L*a*b* values and L*C*H* values (coordinates (a*, b*) on an a*b* plane in the CIE L*a*b* color coordinate system that have been converted to polar coordinates (C*, H*)) to be processed.

The clustering unit 101, based on the color signals (RGB signals) of each pixel of the input image data, classifies the pixels pixel by pixel into clusters each able to be deemed as the same color. The recognizability judging unit 102, based on the representative color of each of the clusters classified by the clustering unit 101, evaluates all combinations of the representative colors for colors hard for color-weak people to recognize and determines the clusters of the combination with a problem in recognizability.

The information obtaining unit 103 obtains the information of the clusters of the combination determined by the recognizability judging unit 102 to have the problem in recognizability. The additional image generating unit 104, based on the information of the clusters of the combination having the problem in recognizability obtained by the information obtaining unit 103, generates image data for image formation with a clear toner. The color converting unit 105 performs an ordinary color conversion of the input image data and converts it into the image data for forming an image with color toners. The image forming unit 106, based on the data for image formation output from the color converting unit 105 and the additional image generating unit 104, forms an image using the color toner images and the clear toner image on the recording medium.

Figure 15:
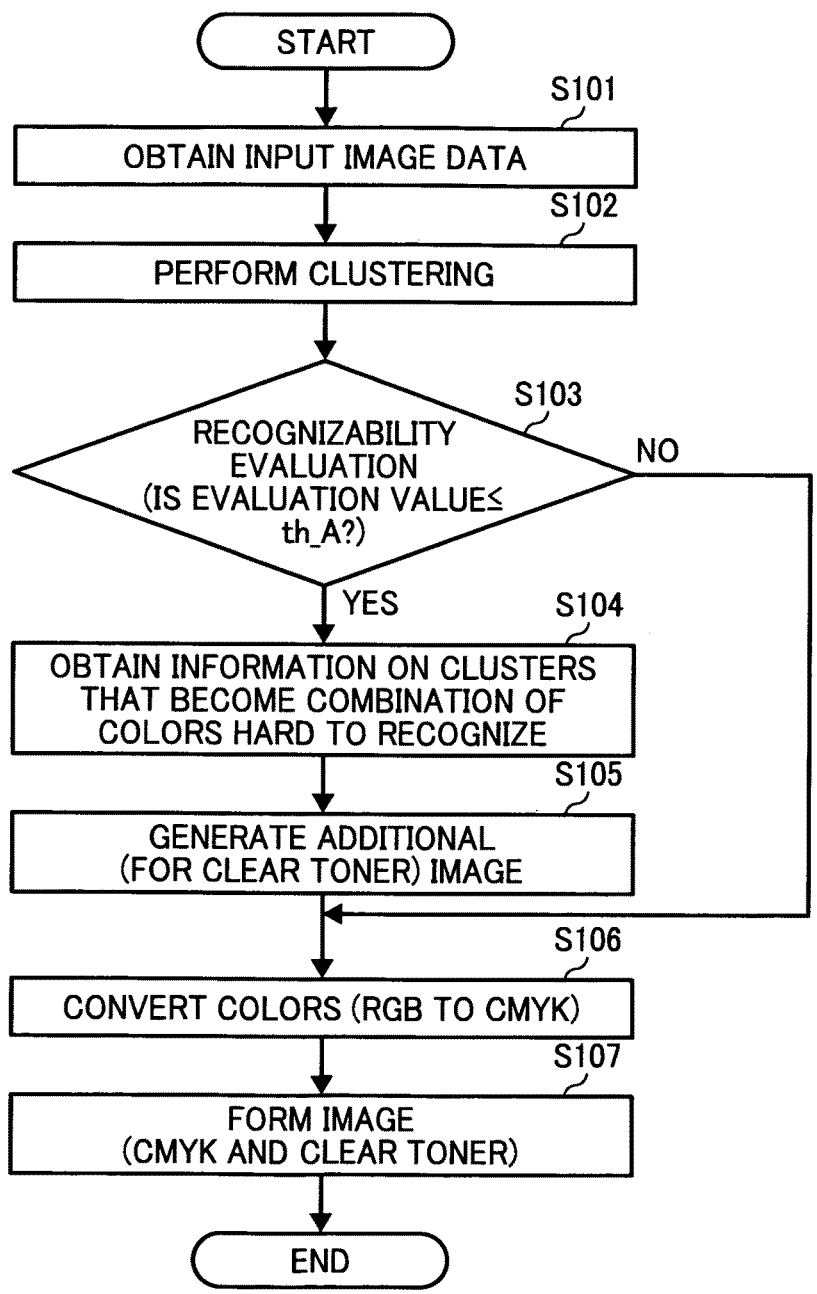
FIG. 15 is a flowchart illustrating a process performed according to the second embodiment.

FIG. 15 is a flowchart illustrating the process performed according to the second embodiment. At Step S101, the input image data is obtained. At Step S102, the clustering unit 101 performs clustering based on the color signals (RGB signals) of each of the pixels in the input image data. The details of the clustering process at Step S102 will be explained.

Figure 16:
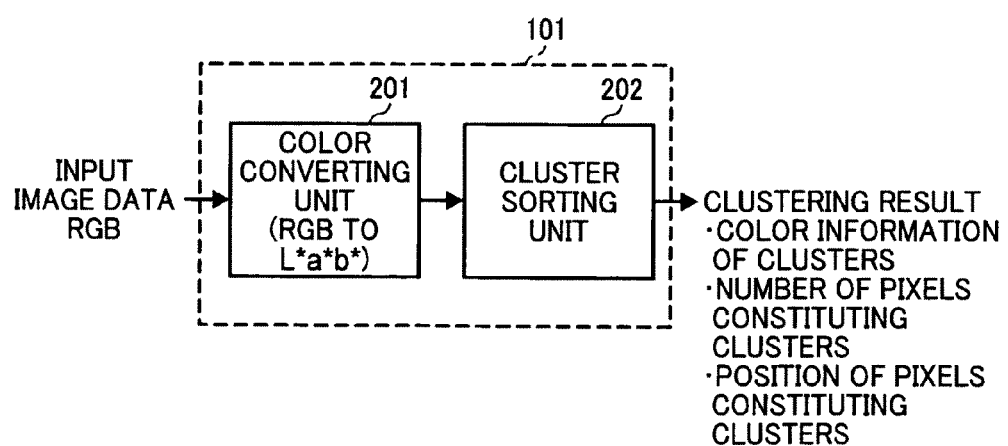
FIG. 16 is a block diagram illustrating a configuration of a clustering unit.

FIG. 16 is a block diagram illustrating a configuration of the clustering unit 101. A color converting unit 201 converts the RGB signals that are the color information of the input pixel into L*a*b* values. A cluster sorting unit 202, based on the L*a*b* values of the input pixels, classifies the pixels pixel by pixel into the clusters each deemed to be substantially the same. Substantially the same herein means that lightness, chroma, and hue are approximately the same.

As a result of the clustering by the cluster sorting unit 202, the color information of clusters, the number of pixels that constitute each cluster, and the positions of pixels that constitute each cluster are obtained. A position of a pixel that constitutes a cluster is information representing, for example, if the upper left position of the input image data is a base point, where the pixel is positioned with respect to the lateral direction and the vertical direction of the image. If the position in the lateral direction is defined as x and the position in the vertical direction is defined as y, the pixel position is expressed as (x, y).

Figure 17:
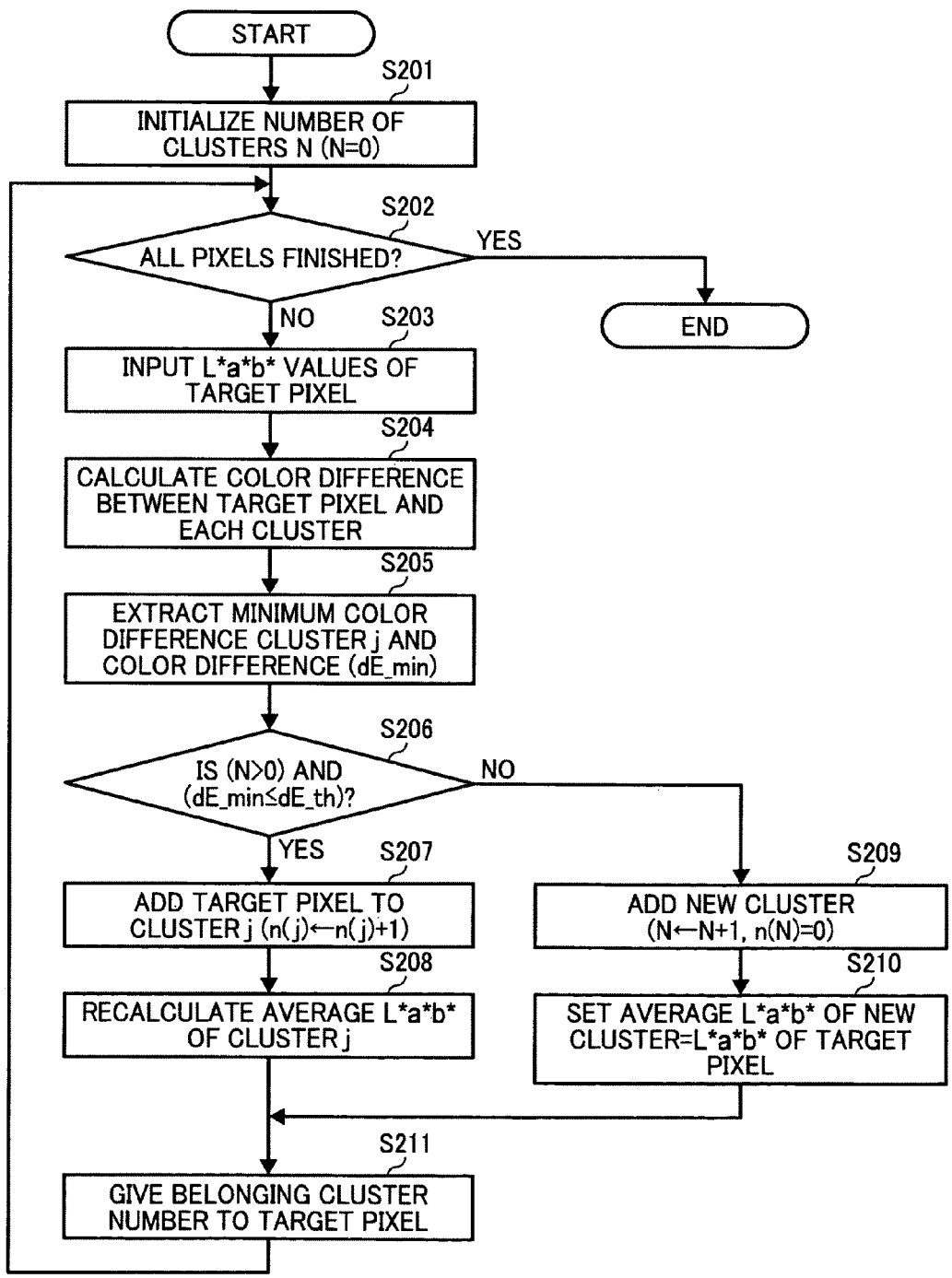
FIG. 17 is a flowchart illustrating a process performed in the clustering unit.

FIG. 17 is a flowchart illustrating a process performed in the clustering unit 101. When a target pixel is input for the first time, because the number of clusters N is in an initialized state, i.e., N=0 (Step S201), the process proceeds to the "NO" direction at the step of conditional branching by color difference (Step S206), then adds a cluster number 1 as a new cluster, and sets the number of clusters N=1 and the number of pixels in the cluster number 1 to n(1)=0 (Step S209). The L*a*b* values of the target pixel are then set as average L*a*b* values of the cluster number 1 (Step S210).

Thereafter, for the L*a*b* values of subsequent target pixels input, the color difference from the average L*a*b* values of each of the clusters are obtained (Step S204), and of these, a pair of the cluster number j having a minimum color difference and a color difference dE_min is obtained (Step S205).

The color difference is calculated by Equation 4:

$$\text{Color difference} = |\Delta L^*| + |\Delta a^*| + |\Delta b^*| \quad \text{Equation 4}$$

where $\Delta L^*$, $\Delta a^*$, and $\Delta b^*$ are difference values in lightness component $L^*$, a-component $a^*$, and b-component $b^*$, respectively, between the target pixel and each of the clusters.

At the step of conditional branching by color difference (Step S206), if the color difference dE_min is equal to or less than a predetermined threshold dE_th (YES at Step S206), the process proceeds to Step S207 to add the input pixel to the cluster j, and to recalculate the average L*a*b* values. The number of pixels of the cluster j, i.e., n(j) is added with +1 and the average values of L*a*b* are recalculated.

$$(\text{Recalculated average } L^*) = ((\text{average } L^* \text{ before recalculation}) \times (n(j)-1) + (L^* \text{ of input pixel}))/n(j)$$

$$(\text{Recalculated average } a^*) = ((\text{average } a^* \text{ before recalculation}) \times (n(j)-1) + (a^* \text{ of input pixel}))/n(j)$$

$$(\text{Recalculated average } b^*) = ((\text{average } b^* \text{ before recalculation}) \times (n(j)-1) + (b^* \text{ of input pixel}))/n(j)$$

When the color difference dE_min exceeds the predetermined threshold dE_th at the step of conditional branching by the color difference (NO at Step S206), the process proceeds to Step S209 to add a new cluster, count up the number of clusters N, and set the number of pixels in the new cluster to 0 (Step S209), and to set the L*a*b* values of the input pixel to the average L*a*b* values (Step S210).

The dE_th expresses the border color difference of whether to add a new cluster and the dE_th is set beforehand. If the target pixel belongs to any one of the clusters, the cluster number is given together with the color information corresponding to the position of the pixel (Step S211). If the processing for all the pixels has finished (YES at Step S202), the clustering ends. If not finished, the process of Step S203 and after that is repeated.

When the clustering is completed, the number of clusters, the number of pixels constituting each of the clusters, the cluster numbers to which the target pixels belong (positions of pixels constituting each of the clusters), and the color information of each cluster (average L*a*b* values of the pixels constituting the cluster) are obtained.

Returning back to FIG. 15, at Step S103, based on the color information of each of the clusters after the clustering (in the present embodiment, average L*a*b* values of the pixels constituting the cluster), the recognizability judging unit 102 judges whether there is any combination of colors hard to be recognized by color-weak people using, for example, an equation for evaluating the recognizability such as Equation 1.

$$(\text{Recognizability}) = \alpha|\Delta L^*| + \beta|\Delta b^*| \quad \text{Equation 1}$$

where $\Delta L^*$ and $\Delta b^*$ are difference values in lightness component $L^*$ and b-component $b^*$, respectively, between the representative colors of two of the clusters after the clustering. In Equation 1, the coefficients $\alpha$ and $\beta$ are constants satisfying $\alpha > \beta$ obtained in advance through subjective evaluations by color-weak people and may be obtained as, for example, $\alpha = 0.17$ and $\beta = 0.13$.

When the evaluation value of the recognizability of the two clusters obtained by Equation 1 is equal to or less than a specified threshold (th_A) (here, th_A=3.0), they are judged as low in recognizability by color-weak people.

If the clusters, which are the combination of colors hard to be recognized, are found to be present by the recognizability evaluation equation (the evaluation value of the recognizability is equal to or less than 3.0), the process proceeds to Step S104. When such clusters are not present, the process proceeds to Step S106.

At Step S104, the information obtaining unit 103 obtains the information with respect to the two clusters of the color combination hard to be recognized. In the present embodiment, the information to obtain is the number of pixels constituting each of the clusters and the cluster number to which each pixel belongs. At Step S105, based on the information obtained at Step S104, the additional image generating unit 104 selects one of the clusters and generates image data to be added to the pixels constituting the selected cluster.

In the present embodiment, the numbers of pixels of the two clusters are compared to select the cluster having a smaller number of pixels, and an additional image generating process is performed to add a clear toner to the pixels constituting the selected cluster. The image data generated is data to flatten the roughness of the surface of the color image.

The additional image generating unit 104 obtains a total amount of color materials of CMYK colors (sum_CMYK) for the RGB values corresponding to the pixels constituting the cluster that have been converted to CMYK values and generates the additional image data to match a predetermined total amount of color materials (Max_Target). This allows for the cluster to be in a state where a total amount of color materials that has been defined in advance is uniformly obtained (state where the roughness of the color image surface is flattened).

When the value of the additional image data is defined as data_T, the additional image data of the target pixel is obtained by the following equation:

$$\text{data\_}T = \text{Max\_Target} - \text{sum\_CMYK}$$

where sum_CMYK is a sum of CMYK data that have been converted from RGB values to CMYK values using an ordinary 3D-LUT or the like, and Max_Target>sum_CMYK. The image data generated is combined with a color converted image of the input image data in the later described image forming unit 106 to form the image on an output medium.

Figure 18:
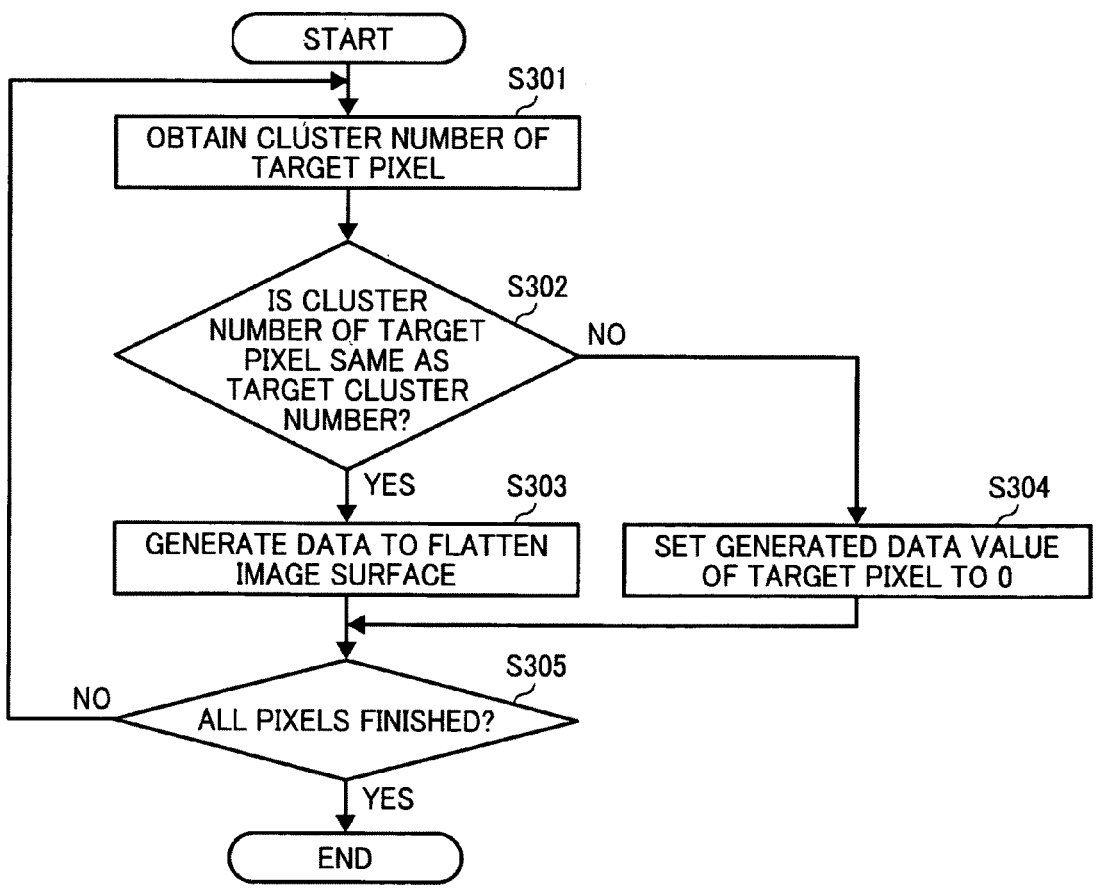
FIG. 18 is a flowchart illustrating a process performed in an additional image generating unit according to the second embodiment.

FIG. 18 is a flowchart illustrating the process performed in the additional image generating unit. At Step S301, the cluster number of the target pixel is obtained. The cluster number of the target pixel is a cluster number obtained when the clustering is performed in the clustering unit 101.

At Step S302, the cluster number of the target pixel is compared with the target cluster number (defined as T) previously selected to generate the additional image data. When the numbers are equal, the process proceeds to Step S303 and the additional image data is generated so as to flatten the surface of the image. When the numbers are not equal, the process proceeds to Step S304 and, as image data representing not to overlay a clear toner, the value of generated data for the target pixel is set to 0.

Consequently, it is possible to overlay a clear toner only on the cluster having the cluster number T. At Step S305, it is judged whether the processing on all the pixels has finished and, if the processing has not finished on all of the pixels, the process returns to Step S301 and the processing for a subsequent target pixel is repeated.

Returning to FIG. 15, at Step S106, the color converting unit 105 performs RGB to CMYK value conversion for the input image data using an ordinary 3D-LUT or the like. At Step S107, the image forming unit 106 forms the image on the recording medium with the color (CMYK) image and the additional image.

Accordingly, whether or not clusters of a combination of colors hard to be recognized by color-weak people are present in the input image data is judged and, if the combination of colors hard to be recognized is present, image data to be overlaid with a clear toner are generated for one of the clusters that is formed of a smaller number of pixels. Consequently, the recognizability by color-weak people is improved, the amount of toner consumption is more efficiently suppressed, and thus the cost of printing is reduced.

Third Embodiment

In the second embodiment, the exemplary embodiment of overlaying the clear toner on the cluster formed of the smaller number of pixels if the combination of colors hard to be recognized is present in the input image data is explained. In a third embodiment of the present invention, if the number of pixels forming the cluster is too small, it is judged that overlaying the clear toner has no effect in improving the recognizability by color-weak people, and the clear toner is overlaid on the cluster having a larger number of pixels instead.

The configuration of the present embodiment is the same as that of the second embodiment explained with reference to FIG. 14 and thus, its explanation is omitted. The difference from the second embodiment is in the process performed at Step S105 in the flowchart of the overall process (FIG. 15) and thus, only the process performed at Step S105 will be explained.

Figure 19:
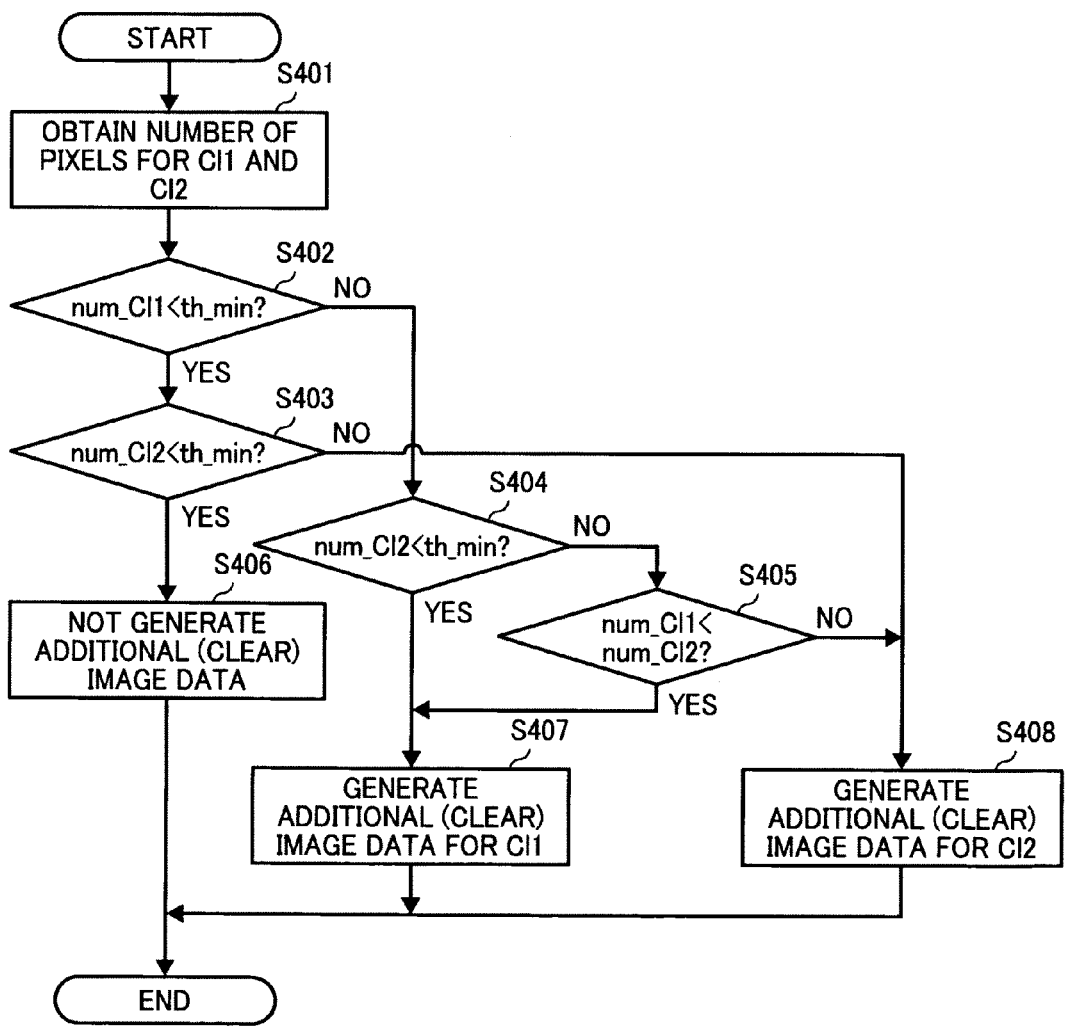
FIG. 19 is a flowchart illustrating a process performed according to a third embodiment of the present invention.

FIG. 19 is a flowchart illustrating the process performed at Step S105 in detail according to the third embodiment. At Step S401, the numbers of pixels for two clusters (defined as Cl1 and Cl2) judged hard to be recognized are obtained. The numbers of pixels constituting the two clusters are defined as num_Cl1 and num_Cl2, respectively.

At Step S402, the num_Cl1 is compared with a predetermined threshold (defined as th_min). If num_Cl1<th_min, the process proceeds to Step S403. If the relation num_Cl1<th_min is not satisfied, the process proceeds to Step S404.

At Step S403, the num_Cl2 is compared with the th_min. If num_Cl2<th_min, the process proceeds to Step S406. If the relation num_Cl2<th_min is not satisfied, the process proceeds to Step S408.

At Step S404, the num_Cl2 is compared with the th_min. If num_Cl2<th_min, the process proceeds to Step S407. If the relation num_Cl2<th_min is not satisfied, the process proceeds to Step S405.

At Step S405, the num_Cl1 is compared with the num_Cl2. If num_Cl1<num_Cl2, the process proceeds to Step S407. If the relation num_Cl1<num_Cl2 is not satisfied, the process proceeds to Step S408.

The process at Step S406 is performed if the numbers of pixels of the two clusters are both below the th_min. In this case, the image data for adding a clear toner is not generated.

The process at Step S407 is performed when the num_Cl1 is equal to or greater than the th_min or when the numbers of pixels of the two clusters are both equal to or greater than the th_min and the number of pixels of the Cl1 cluster is smaller of the two. In this case, the image data is generated to add the clear toner to the pixels constituting the Cl1 cluster.

The process at Step S408 is performed when the num_Cl2 is equal to or greater than the th_min or when the numbers of pixels of the two clusters are both equal to or greater than the th_min and the number of pixels of the Cl2 cluster is smaller of the two. In this case, the image data is generated to add a clear toner to the pixels constituting the Cl2 cluster.

Accordingly, whether or not clusters of a combination of colors hard to be recognized by color-weak people are present in the input image data is judged, and when the combination of colors hard to be recognized is present and even when the cluster having a smaller number of pixels is selected as the cluster to be overlaid with a clear toner, if the number of pixels of that selected cluster is not equal to or greater than the predetermined threshold, image data is generated so as to overlay the clear toner on the cluster having a larger number of pixels, instead of the cluster having the smaller number of pixels. Accordingly, if it is judged that the recognizability by color-weak people is not improved due to the fact that the area for which the additional image data is to be generated is too small, the additional image data is generated by selecting the other one of the clusters, and thus the amount of toner consumption is suppressed without sacrificing the recognizability by color-weak people.

Fourth Embodiment

In a fourth embodiment of the present invention, when the amount of a color material for a target cluster to be added with a clear toner is equal to or greater than a given value, instead of flattening roughness on a surface of an image, additional image data are generated by hatching so as to make the surface of the image rough on the contrary.

Generally, forming an image using a toner by electrophotography causes an image portion to be thickened, but if the image portion has a lot of color materials in the image portion, roughness of the image surface is decreased, and since the image surface may be highly glossy already, a process of adding roughness using a clear toner to roughen the image surface is performed to decrease the glossiness.

The configuration of the present embodiment is the same as the one illustrated in FIG. 14 and thus, its explanation is omitted. The difference from the second embodiment is in the process performed at Step S104 and thereafter in the flowchart of the overall process (FIG. 15) and thus, the process performed at Step S104 and thereafter (the process performed at Steps S101 to S103 is the same as that of the second embodiment) will be explained.

At Step S104, the information with respect to the two clusters of the combination of colors hard to be recognized is obtained. In the present embodiment, the information obtained is the number of pixels constituting each of the clusters and the average L*a*b* values thereof.

The amount of color materials for the pixels constituting the cluster is approximately calculated. In the present embodiment, the approximate amount of color materials calculated is the sum of CMYK values for forming a color image.

FIG. 20 is a flowchart illustrating a process of calculating the approximate amount of color materials for the cluster. At Step S501, the average L*a*b* values of each cluster that has been judged hard to be recognized are converted to RGB values. At Step S502, the RGB values are converted to CMYK values. The conversion to the CMYK values may be performed by conversion using an ordinary 3D-LUT or the like as performed in the color converting unit 105. At Step S503, the sum of the converted CMYK values (sum_CMYK) is calculated, and the process is ended.

At Step S105, the process of generating an additional image for adding a clear toner is performed using the amounts of color materials for the two clusters and the numbers of pixels constituting the clusters.

FIG. 21 is a flowchart illustrating the process performed in the additional image generating unit according to the fourth embodiment. At Step S601, the numbers of pixels constituting the clusters judged hard to be recognized are compared and the cluster having a smaller number of pixels is selected as a cluster to add a clear toner. At Step S602, the sum of CMYK values (sum_CMYK) of the selected cluster is compared with a predetermined threshold (th_B). If the sum_CMYK is below the th_B, the process proceeds to Step S603. If the sum_CMYK is equal to or greater than the th_B, the process proceeds to Step S604.

At Step S603, the process of generating the additional image is performed to add the clear toner so as to flatten the surface of the image of the selected cluster. The process of adding the clear toner to flatten the roughness of the image surface of the selected cluster has been explained in the second embodiment and thus, its explanation is omitted. At Step S604, the additional image data is generated such that the selected cluster is hatched with the clear toner.

An example of the process of hatching includes a method of masking, with the cluster number selected, a hatching image of the same size as the input image data prepared in advance.

Figure 22A:
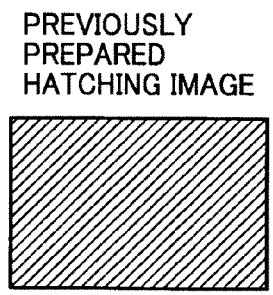
FIGS. 22A to 22C are diagrams for explaining a process performed according to the fourth embodiment.
Figure 22B:
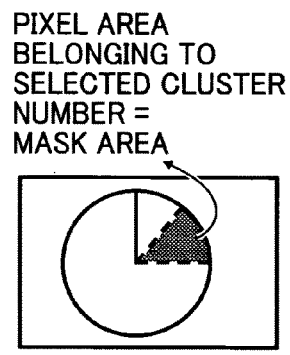

For example, FIG. 22A depicts an example of the hatching image prepared in advance. In the hatching image, black pixels have a pixel value of 255, and white pixels have a pixel value of 0. FIG. 22B depicts an example indicating the pixel area (area within white broken lines) that belongs to the cluster number selected to be subjected to the additional image generating process (an example of a mask image).

Figure 22C:
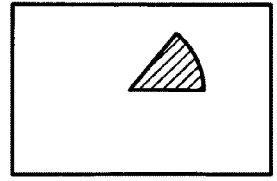

The pixel positions of the hatching image in FIG. 22A are compared with those of the mask image in FIG. 22B. When the pixels are within the area of the mask image, the pixel values of the additional image data are set as the pixel values corresponding to the pixel positions of the hatching image. With respect to the other pixels, by setting the pixel values of the additional image data to 0, the additional image data for hatching only the selected cluster area as illustrated in FIG. 22C are generated.

In the present embodiment, although the exemplified hatching image is an image having a screen angle of 45 degrees, the screen angle may be set differently from that to be used for each color image (C, M, Y, and K colors).

At Step S106, RGB to CMYK value conversion using an ordinary 3D-LUT, or the like is performed on the input image data. At Step S107, the color images (C, M, Y, and K colors) and the clear toner image are formed together on the recording medium.

Accordingly, whether or not clusters of a combination of colors hard to be recognized by color-weak people are present is judged from input image data and the cluster to be overlaid with a clear toner is selected, and if the amount of color materials for the cluster (sum of CMYK values) is equal to or greater than a given threshold, the image data to be overlaid with a clear toner by hatching is generated. Consequently, the image surface of the target cluster is added with roughness, and because the method of generating the additional image data is changed depending on the amount of CMYK color materials for reproducing the target cluster, it is possible to appropriately improve the recognizability by color-weak people.

Fifth Embodiment

In a fifth embodiment of the present invention, when the amounts of color materials for both of the target clusters to be added with a clear toner are equal to or greater than a given value, by overlaying one of the clusters with the clear toner to add roughness on its image surface and overlaying the other one of the clusters with the clear toner to flatten the roughness of its image surface to differentiate the glossiness between the clusters, the recognizability by color-weak people is improved.

The configuration of the present embodiment is the same as the one illustrated in FIG. 14 and thus, its explanation is omitted. The difference from the fourth embodiment is in the process performed at Step S105 and thereafter in the flowchart of the overall process (FIG. 15) and thus, the process performed at Step S105 and thereafter (the process performed at Steps S101 to S104 is the same as that of the fourth embodiment) will be explained.

At Step S105, using the amounts of color materials for the two clusters judged to have the combination of colors hard to be recognized by color-weak people and the numbers of the pixels constituting the clusters, a process of generating an additional image to add a clear toner is performed.

Figure 23:
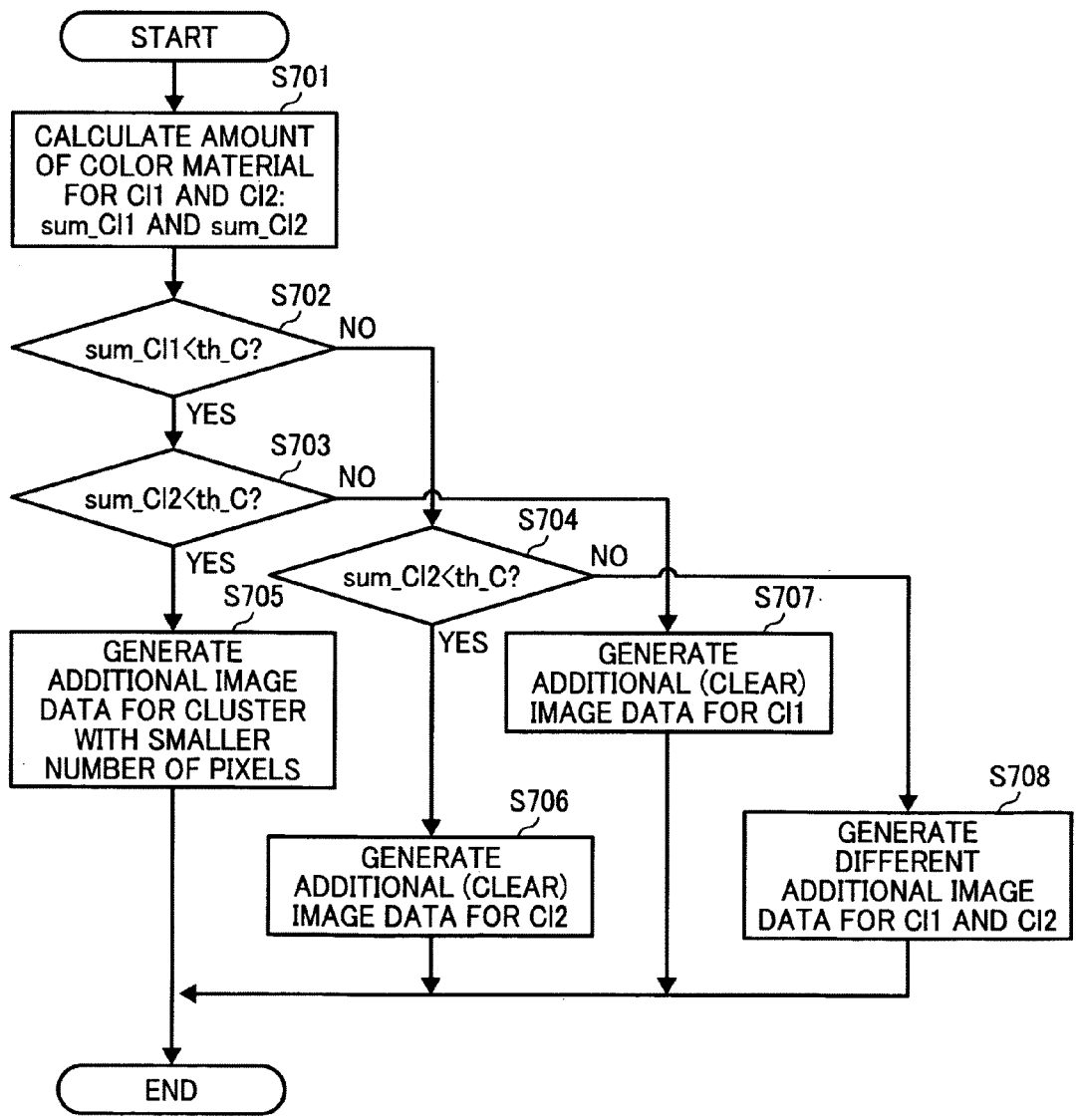
FIG. 23 is a flowchart illustrating a process performed in an additional image generating unit according to a fifth embodiment of the present invention.

FIG. 23 is a flowchart illustrating a process performed in the additional image generating unit according to the fifth embodiment. At Step S701, the sum of CMYK values that is the amount of color materials for each of the clusters judged hard to be recognized (defined as Cl1 and Cl2 in the present embodiment) is calculated (defined as sum_Cl1 and sum_Cl2 in the present embodiment). The calculation method is the same as that explained in the fourth embodiment and thus its explanation is omitted.

At Step S702, the amount of color materials for the cluster Cl1 sum_Cl1 is compared with a predetermined threshold (th_C) and is judged whether it is below the th_C. If sum_Cl1<th_C, the process proceeds to Step S703. If the relation sum_Cl1<th_C is not satisfied, the process proceeds to Step S704.

At Step S703, the sum_Cl2 is compared with the th_C and, if sum_Cl2<th_C, the process proceeds to Step S705. If the relation sum_Cl2<th_C is not satisfied, the process proceeds to Step S707.

At Step S704, the sum_Cl2 is compared with the th_C and, if sum_Cl2<th_C, the process proceeds to Step S706. If the relation sum_Cl2<th_C is not satisfied, the process proceeds to Step S708.

The process at Step S705 is performed when the amounts of color materials for the two clusters are both below the th_C. In this case, the additional image data for the cluster having a smaller number of pixels are generated.

The process at Step S706 is performed when the amount of color materials for only the Cl2 cluster is below the th_C. In this case, the image data for adding a clear toner to the pixels constituting the Cl2 cluster are generated.

The process at Step S707 is performed when the amount of color materials for only the Cl1 cluster is below the th_C. In this case, the image data for adding a clear toner to the pixels constituting the Cl1 cluster are generated.

The process at Step S708 is performed when the amounts of color materials for both of the clusters are equal to or greater than the th_C. In this case, the image data for adding a clear toner for the Cl1 cluster and the Cl2 cluster are generated.

In this case, the additional image data are generated separately for the Cl1 cluster and the Cl2 cluster. The amounts of color materials for the Cl1 cluster and the Cl2 cluster are compared with each other. The additional image data for adding the clear toner so as to flatten the roughness of the image surface are generated for the cluster having a larger amount of color materials, while the additional image data for adding roughness on the image surface with the clear toner are generated for the cluster having a smaller amount of color materials. As for the additional image data for adding roughness, for example, the process of hatching exemplified in the fourth embodiment is performed. Even when the amounts of color materials for the Cl1 cluster and the Cl2 cluster are the same, the additional image data are generated separately.

Accordingly, to reduce glossiness on one of the clusters, hatching with a clear toner is performed to intentionally add roughness on the toner image surface, and to increase glossiness on the other one of the clusters, a clear toner is added to flatten roughness of the image surface, such that a difference is generated between the glossiness on the two clusters. Consequently, the difference in glossiness is positively obtained depending on the amounts of CMYK color materials for reproducing the target clusters, and the recognizability by color-weak people is appropriately improved.

Figure 24:
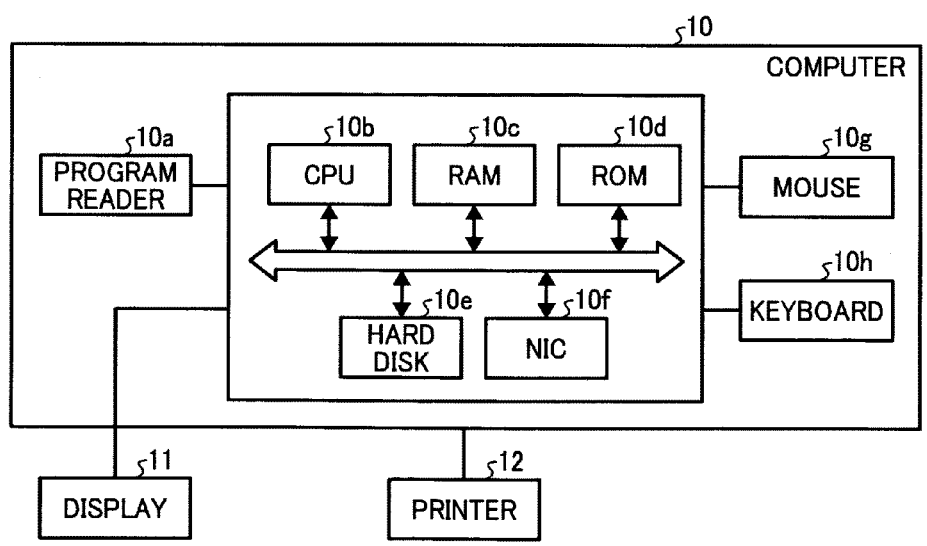
FIG. 24 is a block diagram illustrating an example of a hardware configuration of an image processing system for implementing the present invention with software.

FIG. 24 is a block diagram illustrating an example of a hardware configuration of an image processing system for implementing the present invention with software. A computer 10 includes a program reader 10a, a CPU 10b for the overall control, a RAM 10c used as a work area and the like for the CPU 10b, a ROM 10d storing therein a control program and the like for the CPU 10b, a hard disk 10e, an NIC 10f, a mouse 10g, a keyboard 10h, a display 11 that displays image data and allows a user to input information by directly touching a screen thereof, and an image forming device 12 such as a color printer. The present image processing system may be realized, for example, on a work station or a personal computer.

With such a configuration, the functions of the color extracting unit 1 to the color converting unit 6 illustrated in FIG. 2 and the functions of the clustering unit 101 to the color converting unit 105 illustrated in FIG. 14 are executable by the CPU 10b. The input image data stored in any of the hard disk 10e, the RAM 10c, and the ROM 10d are readable, and the input image data are receivable from the NIC 10f. The image processing function performed by the CPU 10b may be provided, for example, with a software package, more specifically, in a form of an information recording medium such as a CD-ROM or a magnetic disk. Therefore, in the example illustrated in FIG. 24, a medium driving device (not illustrated) to drive the information recording medium when such a medium is set is provided.

Accordingly, the image processing method according to the present invention is able to be implemented with a device configuration that causes a general purpose computer system having a display and the like to read a computer program stored in an information recording medium such as a CD-ROM and causes a central processing unit of the general purpose computer system to execute the image processing. In this case, the computer program to execute the image processing of the present invention, i.e., the computer program used in the hardware system, is provided by being stored in the recording medium. The recording medium storing therein the computer program and the like is not limited to a CD-ROM and may be, for example, a ROM, a RAM, a flash memory, or a magneto-optical disk. The computer program stored in the recording medium is installed in a storage device built in the hardware system, for example, the hard disk 10e, and the installed computer program is executed to realize the image processing function. The computer program to realize the image processing function of the present invention is not only provided in a form of a recording medium, but may also be provided, for example, from a server through communications via a network.

According to an aspect of the present invention, colors used in input image data are extracted, whether or not the extracted colors include any combination of colors that is hard to be distinguished by color-weak people is evaluated; and if a combination of colors that is hard to be distinguished is present, a clear toner image is added to an area of one of the colors of the combination to change diffuse characteristics (glossiness) of its surface. Consequently, color conversion is able to be performed such that the color-weak people are able to easily distinguish between colors in filled areas of the input image such as a graph, without causing a document creator and people with common color vision to feel a sense of incongruity.

According to another aspect of the present invention, a combination of clusters that is hard to be distinguished by color-weak people are adaptively determinable based on input image, and additional image data to be added for improving recognizability of colors by the color-weak people are able to be efficiently generated. Furthermore, the amount of toner consumption required to reproduce the additional image data and thus the cost of printing are able to be reduced.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus configured to convert input image data into image data for forming an image, the image processing apparatus comprising:
   a color extracting unit configured to extract colors used in the input image data;
   a color signal converting unit configured to convert signals of the extracted colors into intermediate color signals each including three color signal components including brightness;
   a recognizability evaluating unit configured to evaluate recognizabilities of the colors based on the intermediate color signals converted;
   an additional image generating unit configured to generate additional image data to be added to data for ordinary image formation based on a result of the evaluation by the recognizability evaluating unit and the input image data; and
   a color converting unit configured to convert the input image data into the data for ordinary image formation,
   wherein the additional image data generated by the additional image generating unit is image formation data for controlling an image forming material that changes diffuse characteristics of a surface of an output medium, and
   wherein the additional image generating unit is further configured to generate data for forming the additional image with respect to an area of a color having a higher lightness, of a combination of colors evaluated to have low recognizabilities by the recognizability evaluating unit, if a difference between lightnesses of the combination of colors is greater than a predetermined value or if the difference in lightnesses of the combination of colors is equal to or less than the predetermined value and a difference between chroma of the combination of colors is equal to or less than a predetermined value, and the additional image generating unit is further configured to generate data for forming the additional image with respect to an area of a color having a lower chroma, of the combination of colors, if the difference between lightnesses of the combination of colors is equal to or less than the predetermined value and the difference between chroma of the combination of colors is greater than the predetermined value.

2. The image processing apparatus according to claim 1, wherein the additional image data generating unit is further configured to generate data for forming the additional image with respect to an area of one the combination of colors evaluated to have low recognizabilities by the recognizability evaluating unit if a difference between a hue of the one of the combination of colors and a hue angle of a chromatic image forming color material used in an ordinary image formation is equal to or less than a predetermined value.

3. The image processing apparatus according to claim 1, further comprising a color correcting unit configured to improve the recognizabilities of the colors by performing color correction if the recognizabilities are not changeable according to presence or absence of the additional image data.

4. An image processing method of converting input image data into image data for forming an image, the image processing method comprising:
   extracting colors used in the input image data;
   converting signals of the extracted colors into intermediate color signals each including three color signal components including brightness;
   evaluating recognizabilities of the colors based on the intermediate color signals converted;
   generating additional image data to be added to data for ordinary image formation based on a result of the evaluation and the input image data; and
   converting the input image data to the data for ordinary image formation,
   wherein the generated additional image data is image formation data for controlling an image forming material that changes diffuse characteristics of a surface of an output medium, and
   wherein the operation of generating additional image data further includes generating data for forming the additional image with respect to an area of a color having a higher lightness, of a combination of colors evaluated to have low recognizabilities by the operation of evaluating recognizabilities, if a difference between lightnesses of the combination of colors is greater than a predetermined value or if the difference in lightnesses of the combination of colors is equal to or less than the predetermined value and a difference between chroma of the combination of colors is equal to or less than a predetermined value, and the operation of generating additional image data further includes generating data for forming the additional image with respect to an area of a color having a lower chroma, of the combination of colors, if the difference between lightnesses of the combination of colors is equal to or less than the predetermined value and the difference between chroma of the combination of colors is greater than the predetermined value.

5. The image processing apparatus according to claim 1, wherein the image forming material is clear toner which changes diffuse characteristics of the surface of the output medium, and the additional image generating unit is configured to generate the image formation data for controlling the clear toner based on the result of the evaluation by the recognizability evaluating unit and the input image data.

6. The image processing method according to claim 4, wherein the image forming material is clear toner which changes diffuse characteristics of the surface of the output medium, and the generating additional image data includes generating the image formation data for controlling the clear toner based on the result of the evaluation by the recognizability evaluating unit and the input image data.

7. An image processing apparatus configured to convert input image data into image data for forming an image, the image processing apparatus comprising:
- a color extracting unit configured to extract colors used in the input image data;
- a color signal converting unit configured to convert signals of the extracted colors into intermediate color signals each including three color signal components including brightness;
- a recognizability evaluating unit configured to evaluate recognizabilities of the colors based on the intermediate color signals converted;
- an additional image generating unit configured to generate additional image data to be added to data for ordinary image formation based on a result of the evaluation by the recognizability evaluating unit and the input image data; and
- a color converting unit configured to convert the input image data into the data for ordinary image formation, wherein the additional image data generated by the additional image generating unit is image formation data for controlling an image forming material that changes diffuse characteristics of a surface of an output medium,
- wherein the image forming material is clear toner which changes diffuse characteristics of the surface of the output medium, and the additional image generating unit is configured to generate the image formation data for controlling the clear toner based on the result of the evaluation by the recognizability evaluating unit and the input image data,
- wherein the image processing apparatus further includes a clustering unit configured to divide pixels of the input image data into a plurality of pixel clusters each including two or more of the pixels of the input image data,
- wherein the recognizability evaluating unit is configured to evaluate the recognizabilities of the colors based on the intermediate color signals converted by generating a color difference value indicating a difference between color characteristics of first and second pixel clusters from among the plurality of pixel clusters, and comparing the color difference value to a threshold value, and
- wherein the additional image generating unit is configured to generate additional image data to be added to data for ordinary image formation when the color difference value exceeds a threshold value, the additional image data being image formation data for controlling the clear toner to be applied to a portion of an output medium corresponding to the first pixel cluster.

8. An image processing method of converting input image data into image data for forming an image, the image processing method comprising:
- extracting colors used in the input image data;
- converting signals of the extracted colors into intermediate color signals each including three color signal components including brightness;
- evaluating recognizabilities of the colors based on the intermediate color signals converted;
- generating additional image data to be added to data for ordinary image formation based on a result of the evaluation and the input image data; and
- converting the input image data to the data for ordinary image formation, wherein the generated additional image data is image formation data for controlling an image forming material that changes diffuse characteristics of a surface of an output medium, wherein the image forming material is clear toner which changes diffuse characteristics of the surface of the output medium, and the additional image generating unit is configured to generate the image formation data for controlling the clear toner based on the result of the evaluation by the recognizability evaluating unit and the input image data,
wherein the method further includes dividing pixels of the input image data into a plurality of pixel clusters each including two or more of the pixels of the input image data,
wherein the evaluating includes evaluating recognizabilities of the colors based on the intermediate color signals converted by generating a color difference value indicating a difference between color characteristics of first and second pixel clusters from among the plurality of pixel clusters, and comparing the color difference value to a threshold value, and
wherein the generating includes generating additional image data to be added to data for ordinary image formation when the color difference value exceeds a threshold value, the additional image data being image formation data for controlling the clear toner to be applied to a portion of an output medium corresponding to the first pixel cluster.

* * * * *